US007365935B2

(12) United States Patent
Hori et al.

(10) Patent No.: US 7,365,935 B2
(45) Date of Patent: Apr. 29, 2008

(54) MEDIA CARTRIDGE AUTOLOADER

(75) Inventors: Kenichi Hori, Tama (JP); Hiromi Tanaka, Tama (JP); Paddy Eliot Collins, Colorado Springs, CO (US)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 357 days.

(21) Appl. No.: 11/273,870

(22) Filed: Nov. 15, 2005

(65) Prior Publication Data

US 2007/0030589 A1 Feb. 8, 2007

(30) Foreign Application Priority Data

Aug. 8, 2005 (JP) .............................. 2005-229738

(51) Int. Cl.
*G11B 15/68* (2006.01)

(52) U.S. Cl. ...................................................... 360/92

(58) Field of Classification Search ................... 360/92, 360/98.06; 369/30.42, 30.43, 30.47
See application file for complete search history.

(56) References Cited

U.S. PATENT DOCUMENTS

| 7,158,341 | B2 * | 1/2007 | Taki et al. ..................... 360/92 |
| 2003/0095355 | A1 * | 5/2003 | Shimanuki .................... 360/92 |
| 2003/0117744 | A1 * | 6/2003 | Tanaka ......................... 360/92 |
| 2004/0008445 | A1 * | 1/2004 | Vanderheyden .............. 360/92 |
| 2005/0162775 | A1 * | 7/2005 | Ojima et al. .................. 360/92 |
| 2005/0207058 | A1 * | 9/2005 | Taki et al. ..................... 360/92 |

FOREIGN PATENT DOCUMENTS

JP          2003 45102          2/2003

\* cited by examiner

*Primary Examiner*—Allen Cao
(74) *Attorney, Agent, or Firm*—Ladas & Parry LLP

(57) ABSTRACT

A media cartridge autoloader including first and second media cartridge transport magazines is disclosed. A magazine drive includes a drive shaft unit, a drive shaft unit shifting mechanism, and a magazine drive motor module. A mechanism that rotates a turntable of a media cartridge picker is also used to move the drive shaft unit such that the drive shaft unit is selectively coupled with either one of the first or second media cartridge transport magazines. A drive shaft of the drive shaft unit is driven by a magazine drive motor of the magazine drive motor module, so that the coupled media cartridge transport magazine is driven.

12 Claims, 30 Drawing Sheets

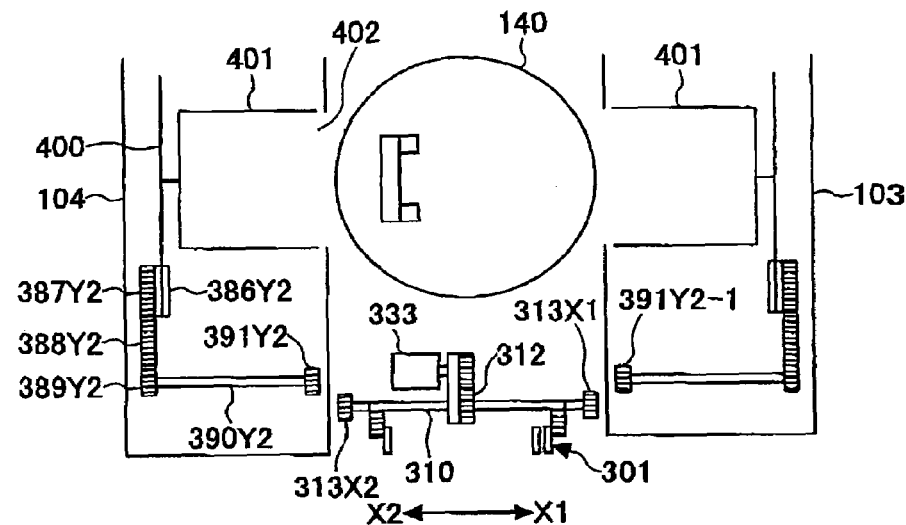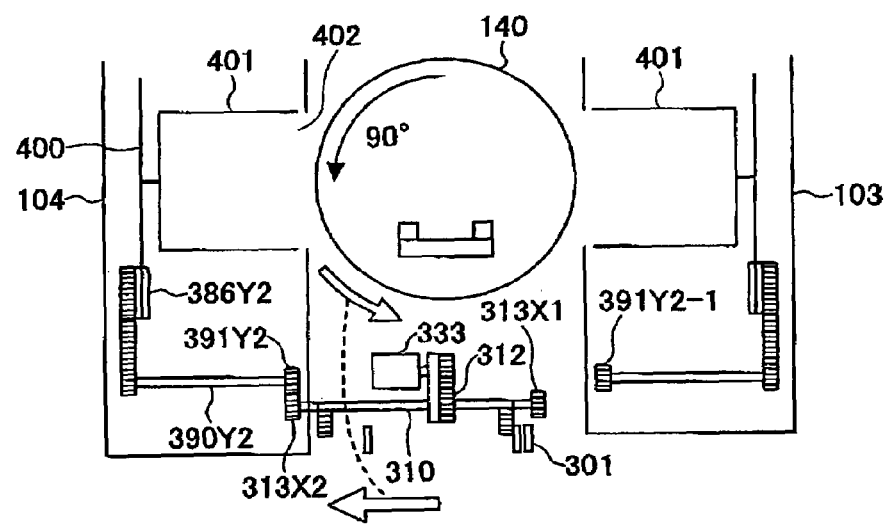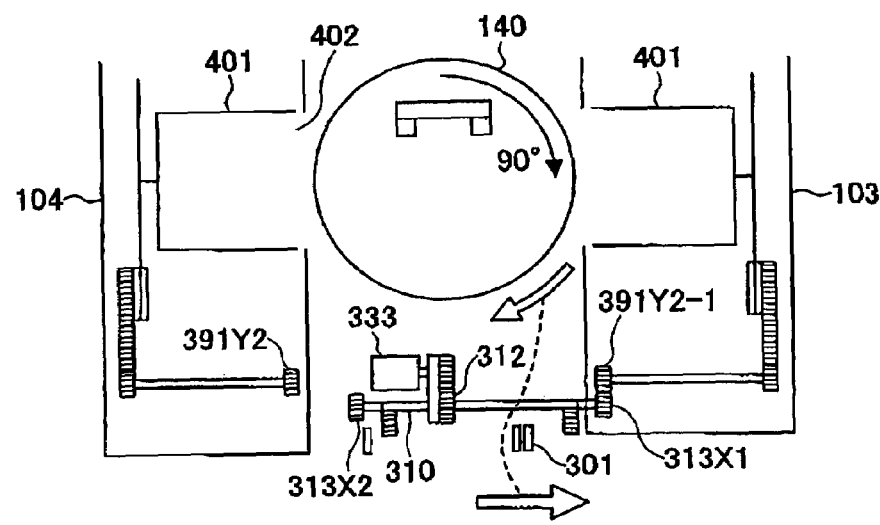

MEDIA CARTRIDGE AUTOLOADER

BACKGROUND OF THE INVENTION

1. Field of the Invention

The present invention generally relates to a media cartridge autoloader, and particularly relates to a mechanism that selectively moves either one of two or more media cartridge transport magazines in a media cartridge autoloader serving as a data storage device.

2. Description of the Related Art

A typical media cartridge autoloader includes a media cartridge picker in the center, a mail slot, a read/write media drive, and one or more media cartridge transport magazines.

The media cartridge picker is configured to transport a media cartridge among the mail slot, the media drive, and the media cartridge transport magazine(s).

Each media cartridge transport magazine comprises a plurality of media cartridge storage cases that store the media cartridges therein. A selected one of the media cartridge storage cases is moved next to the media cartridge picker.

To store many media cartridges, a plurality of media cartridge transport magazines can be used.

SUMMARY OF THE INVENTION

The present invention is directed toward a media cartridge autoloader that includes a media cartridge autoloader comprising a media cartridge picker that transports a tape cartridge; a tape drive that receives the media cartridge, and first and second media cartridge transport magazines positioned near the cartridge picker, each media cartridge transport magazine being configured to selectively store the media cartridge. The media cartridge autoloader further includes a magazine drive device having a magazine drive motor, the magazine drive device alternately driving each of the media cartridge transport magazines with a driving force of the magazine drive motor.

According to the present invention, the single magazine drive motor drives both the first and second media cartridge transport magazines. There is no need to provide a separate magazine drive motor for each of the media cartridge transport magazines, so the production cost of the media cartridge autoloader is lowered.

BRIEF DESCRIPTION OF THE DRAWINGS

FIG. 24A illustrates the media cartridge transport magazine drive in its initial state;

FIG. 24B illustrates the media cartridge transport magazine drive in a state to drive an X2-side magazine;

FIG. 24C illustrates the media cartridge transport magazine drive in a state to drive an X1-side magazine;

DETAILED DESCRIPTION OF THE PREFERRED EMBODIMENT

An exemplary embodiment of the present invention is described hereinafter with reference to the accompanying drawings.

First Embodiment

The description of a first embodiment includes the following:

1. Configuration and Operations Overview of Media Cartridge Autoloader 100
2. Configuration of Main Module 110
3. Configuration and Operations of Media cartridge Picker 102

4. Configuration of Media Cartridge Transport Magazine Drive Device 300
    4-1. Configuration of Drive Shaft Unit 301
    4-2. Configuration of Drive Shaft Unit Shifting Mechanism 320
    4-3. Configuration of Magazine Drive Motor Module 330
5. Configuration of Media Cartridge Transport Magazines 103, 104
6. Operations for Selectively Driving Media Cartridge Transport Magazines 103, 104
7. Operations of Microcomputer of Motor Control Circuit 410

1 [Configuration and Operations Overview of Media Cartridge Autoloader 100]

Figure 1:
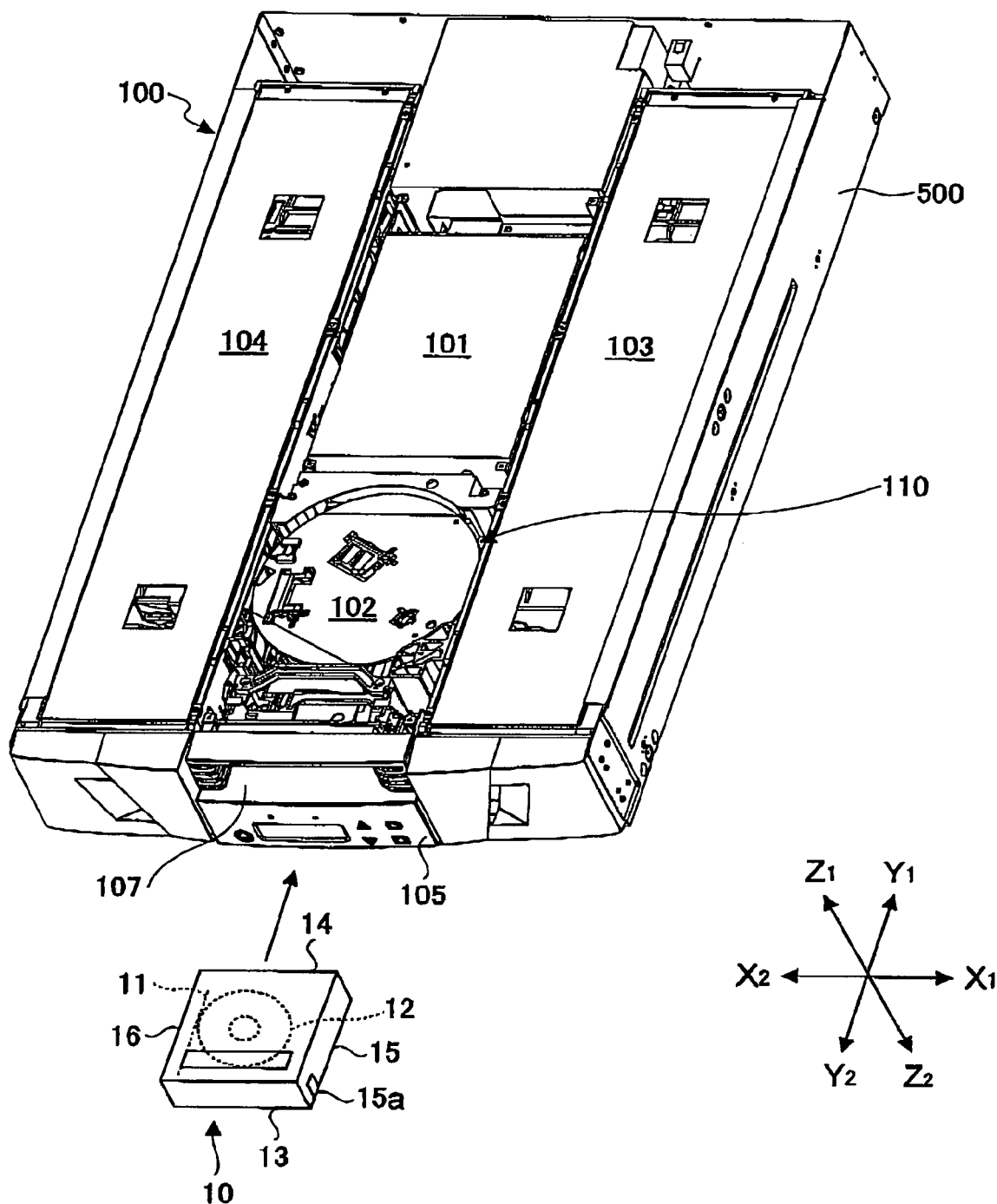
FIG. 1 is a perspective view illustrating a media cartridge autoloader with an upper cover thereof removed according to a first embodiment of the present invention.
Figure 2:
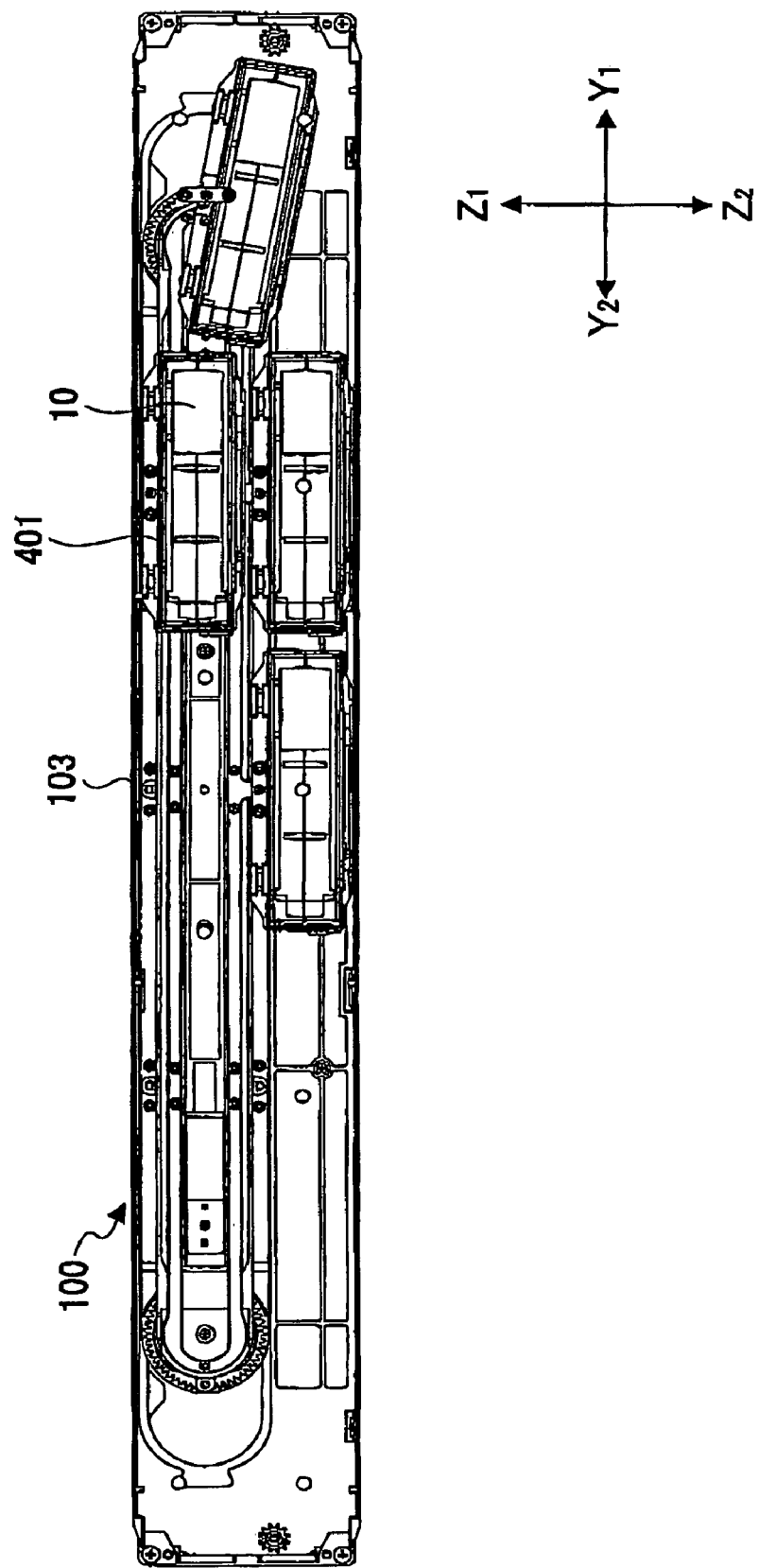
FIG. 2 is a side view illustrating the media cartridge autoloader of FIG. 1 with a side cover thereof removed.

FIG. 1 is a perspective view illustrating a media cartridge autoloader 100 with an upper cover thereof removed according to the first embodiment of the present invention. FIG. 2 is a side view illustrating the media cartridge autoloader 100 with a side cover thereof removed. Throughout the drawings, the width direction is indicated by a line X1-X2, the depth direction is indicated by a line Y1-Y2, and the height direction is indicated by a line Z1-Z2.

Further, although the examples provided herein focus on an autoloader that uses storage tape as the media, this description is for ease of discussion only. It is recognized that any suitable type of media cartridge can be used with the present invention, with the structures being adapted to accommodate such different types of cartridges. The embodiments disclosed herein are not intended to limit the scope of the present invention in any manner to use with tape cartridges only.

In one embodiment, the tape cartridge autoloader 100 generally comprises a metal frame 500, a control panel 105 and a mail slot 107 both on a front panel, a main module 110 including a tape cartridge picker 102 at a position opposing the mail slot 107, a tape drive 101 disposed at the Y1 side of the main module 110, and first and second tape cartridge transport magazines 103 and 104 disposed one at the X1 side and the X2 side of the main module 110. The tape cartridge transport magazines 103 and 104 can be inserted toward the Y1 side from the front panel side and removably attached on opposing sides of the frame 500. It is understood that either tape cartridge transport magazine 103, 104 can be the first tape cartridge transport magazine or the second tape cartridge transport magazine. The tape cartridge autoloader 100 can be mounted in a rack by, for example, fixing four corners of the frame 500 to poles of the rack.

In certain embodiments, the tape cartridge autoloader 100 is designed such that operations of the tape cartridge picker 102 and operations of the tape cartridge transport magazines 103 and 104 do not overlap in terms of time.

A tape cartridge 10 is used in the tape cartridge autoloader 100. Referring to FIG. 1, the tape cartridge 10 includes a magnetic tape 11 wound on a single reel 12 therein such that the magnetic tape 11 is pulled out from a rear face of the tape cartridge 10. The tape cartridge 10 includes a front face 13, a rear face 14, side faces 15 and 16, and a notch 15a formed on the side face 15 which a cartridge pin (described below) engages. The tape cartridge transport magazines 103 and 104 are each configured to store plural tape cartridges 10 orienting the front faces 13 to face the tape cartridge picker 102. The tape cartridge transport magazines 103 and 104 are also configured to transport the tape cartridges 10 along a racetrack path elongated in the Y1-Y2 direction, as shown in FIG. 2.

The tape drive 101 is operable to read and/or write data from or to the magnetic tape 11 pulled out from the loaded tape cartridge 10. The tape drive 101 includes a tape cartridge ejecting mechanism (not shown). Plural types of tape drives with different heights are available so that one drive is selected from them and attached to the tape cartridge autoloader 100. For this operation, the tape cartridge picker 102 is provided with a turntable lifting mechanism 150 (described below).

Figure 3:
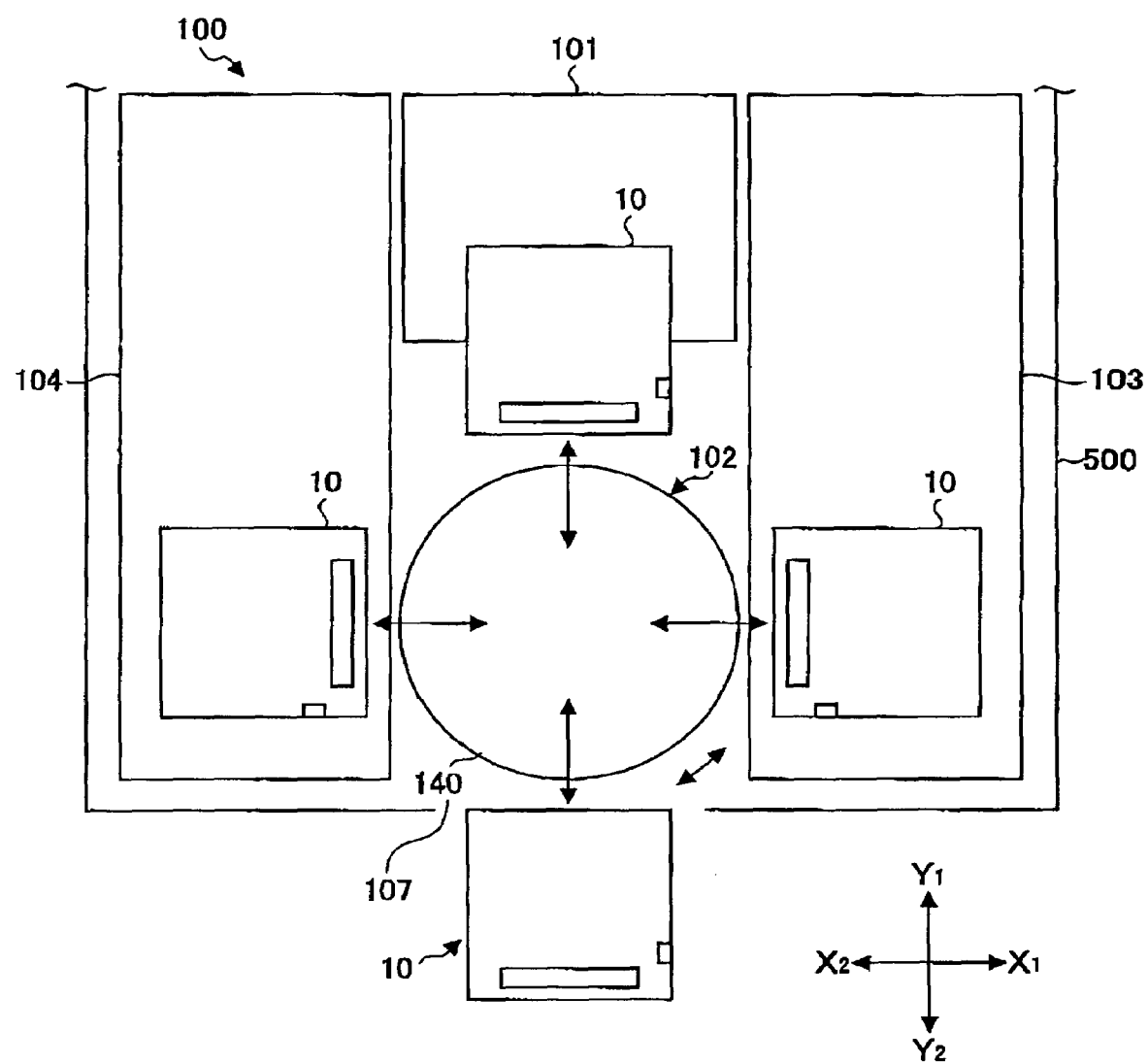
FIG. 3 is a schematic illustration showing operations of a media cartridge picker.

Referring to FIG. 3, the tape cartridge picker 102 is configured to transport the tape cartridge 10 onto or off of a turntable 140 for operations such as loading the tape cartridge 10 inserted through the mail slot 107 into the tape drive 101, retrieving the tape cartridge 10 from the tape cartridge transport magazines 103 and 104 to load the tape cartridge 10 onto the tape drive 101, retrieving the tape cartridge from the tape drive 101 to return the tape cartridge 10 to one of the tape cartridge transport magazines 103 and 104, and ejecting the tape cartridge 10 through the mail slot 107. The tape cartridge picker 102 is also configured to rotate the turntable 140 by a predetermined rotational increment, such as approximately every 90 degrees, for example, although the rotational increment can vary depending upon the design requirements of the autoloader 100. The tape cartridge picker 102 can also lift/lower the turntable 140, as necessary. When the turntable 140 is rotated, the orientation of the tape cartridge 10 is changed.

Figure 4:
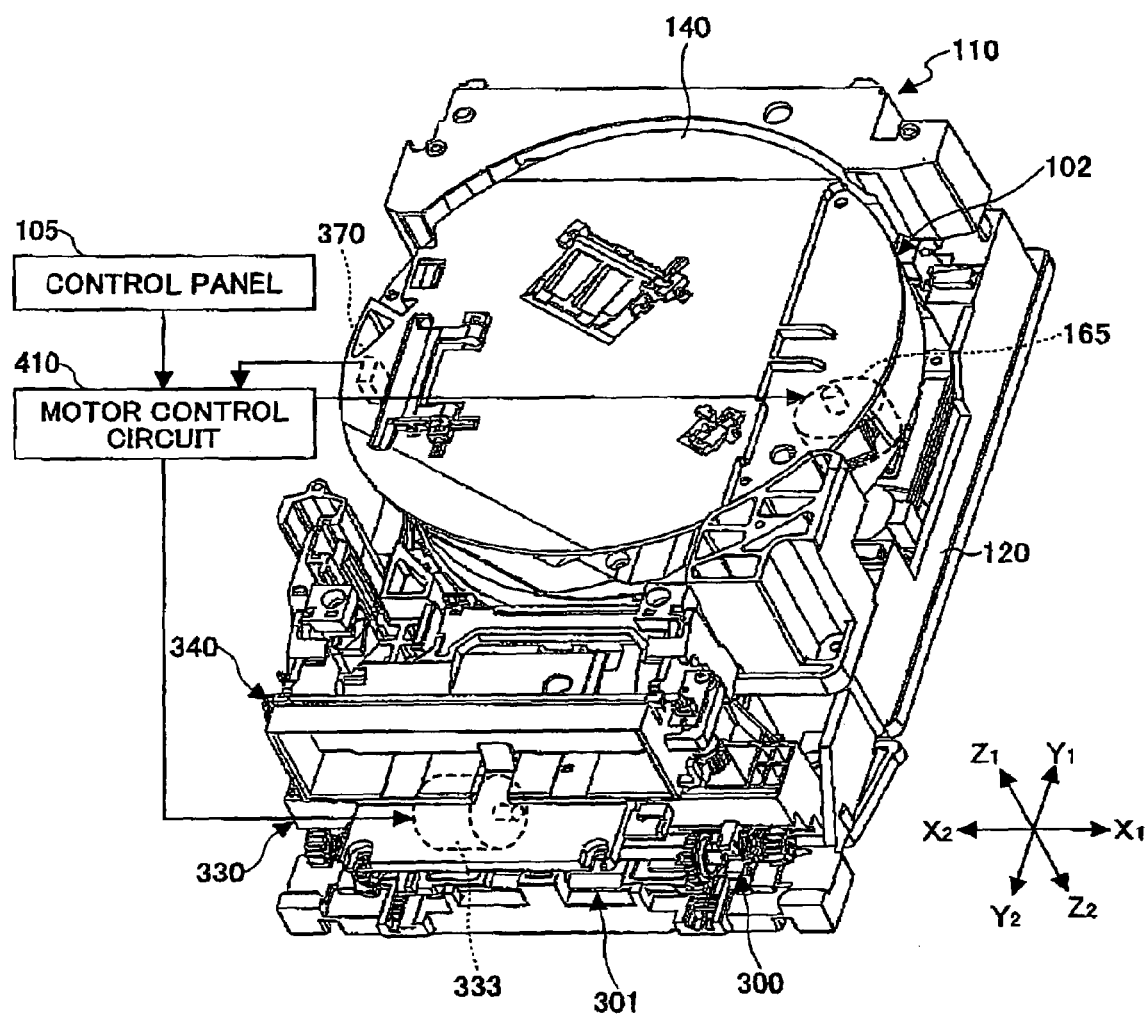
FIG. 4 is a perspective view illustrating a main module.
Figure 5:
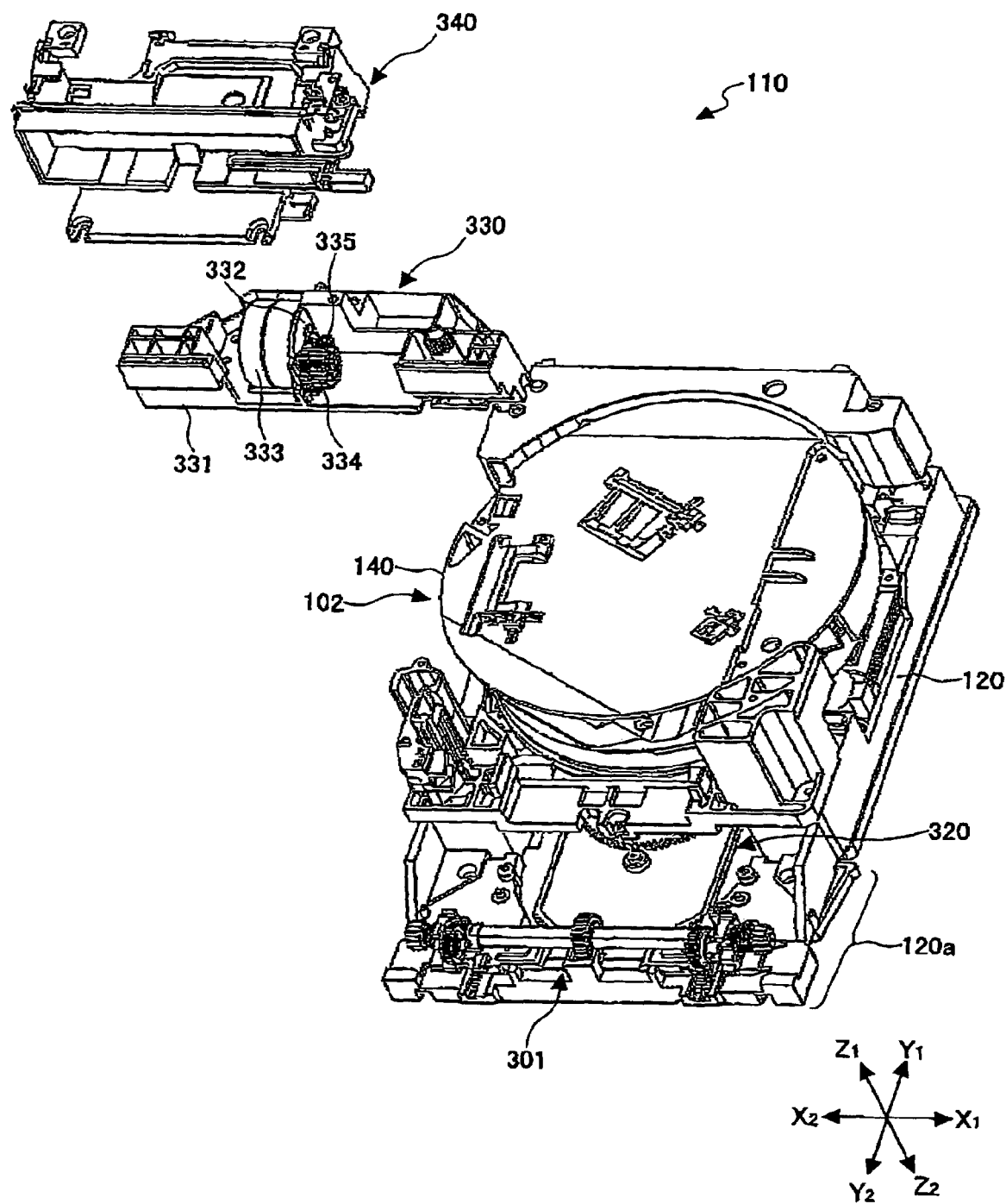
FIG. 5 is an exploded view illustrating the main module.
Figure 6:
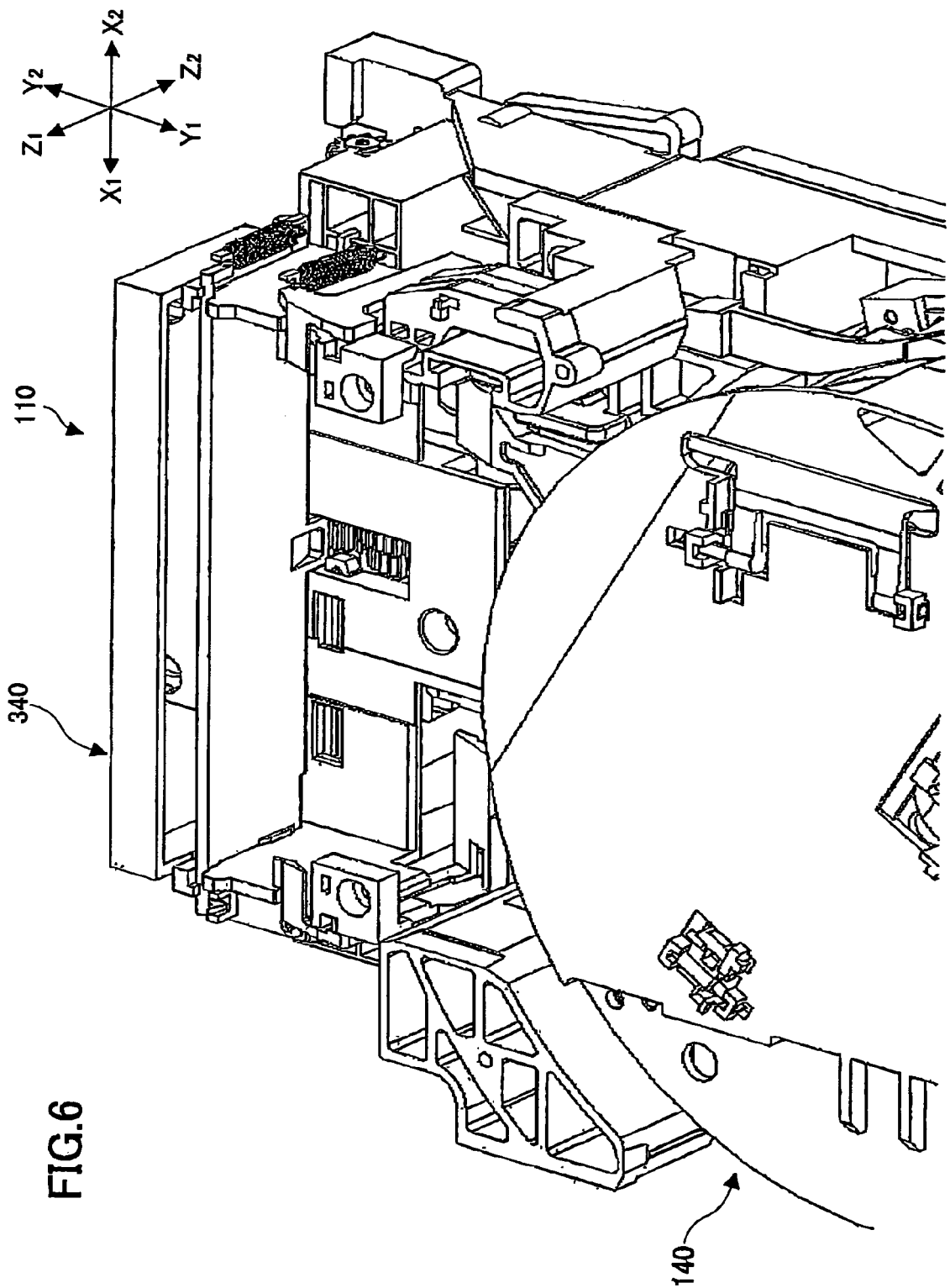
FIG. 6 is a perspective view of the main module, viewed from a Y1 side.

2 [Configuration of Main Module 110] (FIGS. 4-6)

FIG. 4 is a perspective view of the main module 110. FIG. 5 is an exploded view of the main module 110. FIG. 6 is a perspective view of the main module 110, viewed from the Y1 side.

In this embodiment, the main module 110 includes a base 120. The main module 110 also includes the tape cartridge picker 102 and a tape cartridge transport magazine drive device 300. The tape cartridge picker 102 can occupy a large part of the base 120. The base 120 includes an extension 120a extending at the Y2 side of the tape cartridge picker 102. A drive shaft unit 301 and a tape cartridge transport magazine drive motor module 330 are disposed on the extension 120a. For example, a mail slot module 340 can be mounted on the upper side of the magazine drive motor module 330. The magazine drive device 300 comprises the drive shaft unit 301 and the magazine drive motor module 330 as described below.

A motor control circuit 410 shown in FIG. 4 drives, in response to a command generated when a user operates the control panel 105, a stepping motor 165 and a magazine drive motor 333 in a manner described below while monitoring signals from a photo sensor 370.

3 [Configuration and Operations of Tape Cartridge Picker 102] (FIGS. 7-12)

Figure 7:
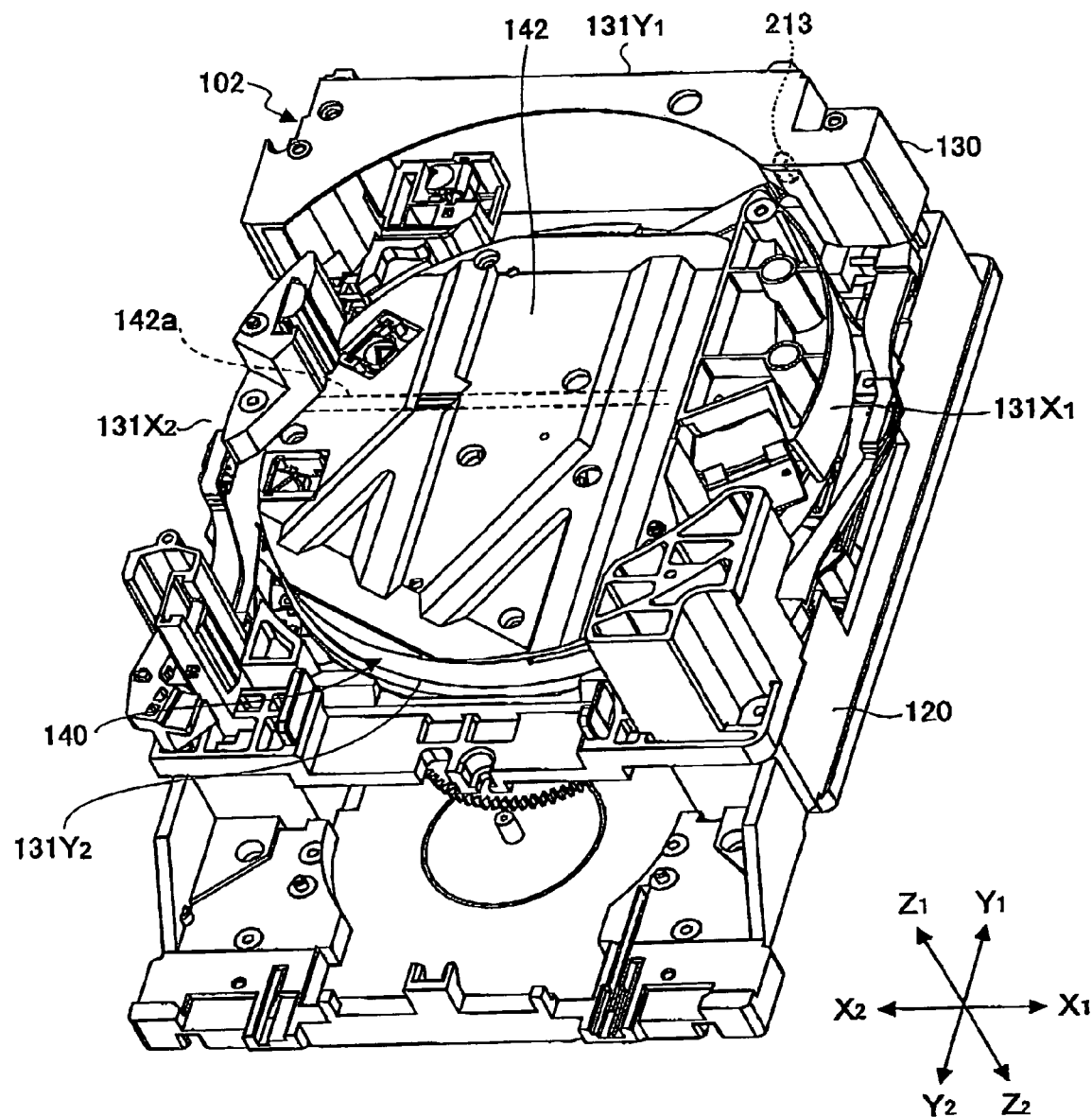
FIG. 7 is a perspective view illustrating the media cartridge picker.
Figure 8:
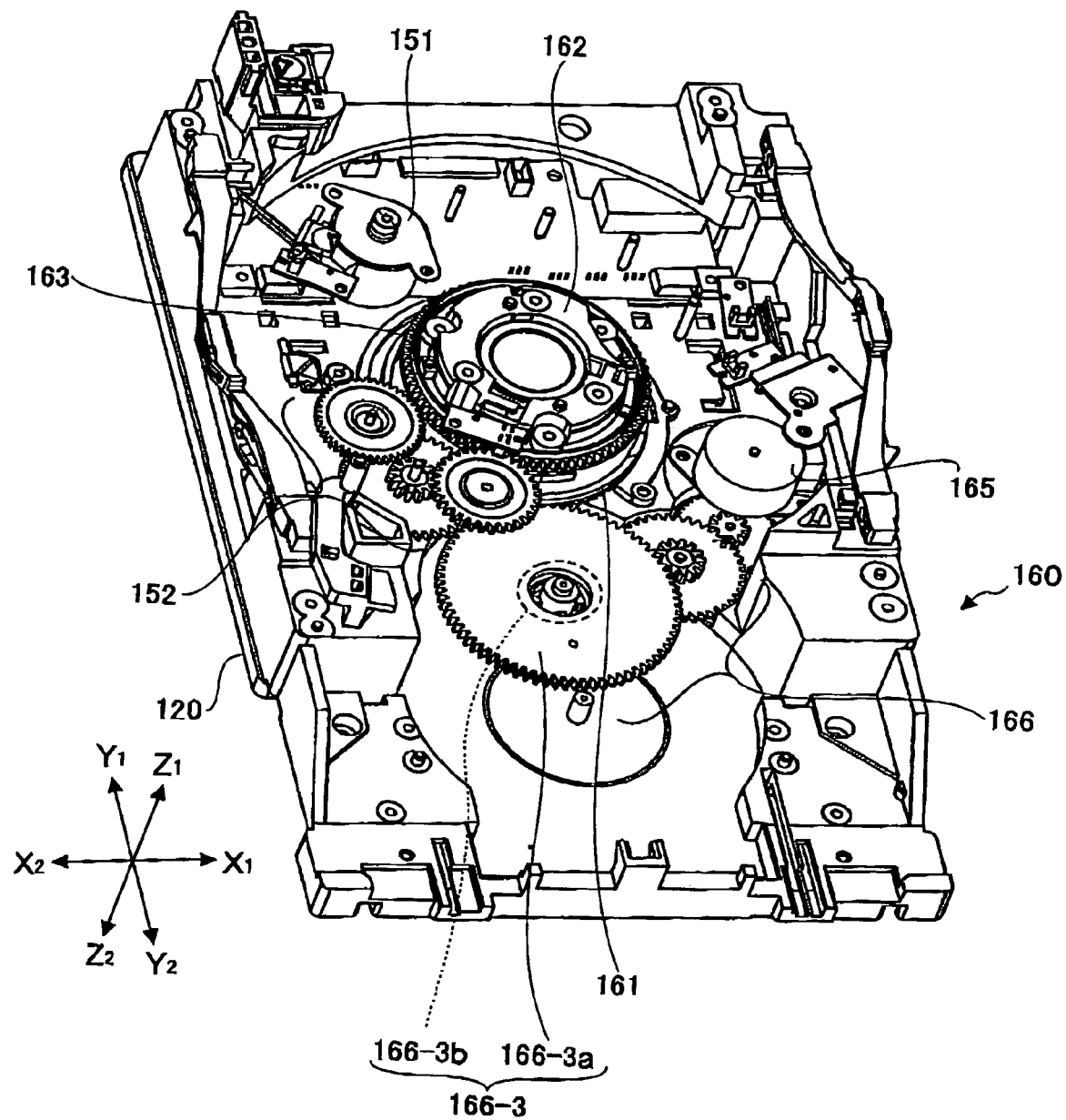
FIG. 8 is a perspective view illustrating the media cartridge picker with a pillar and a turntable removed.
Figure 9:
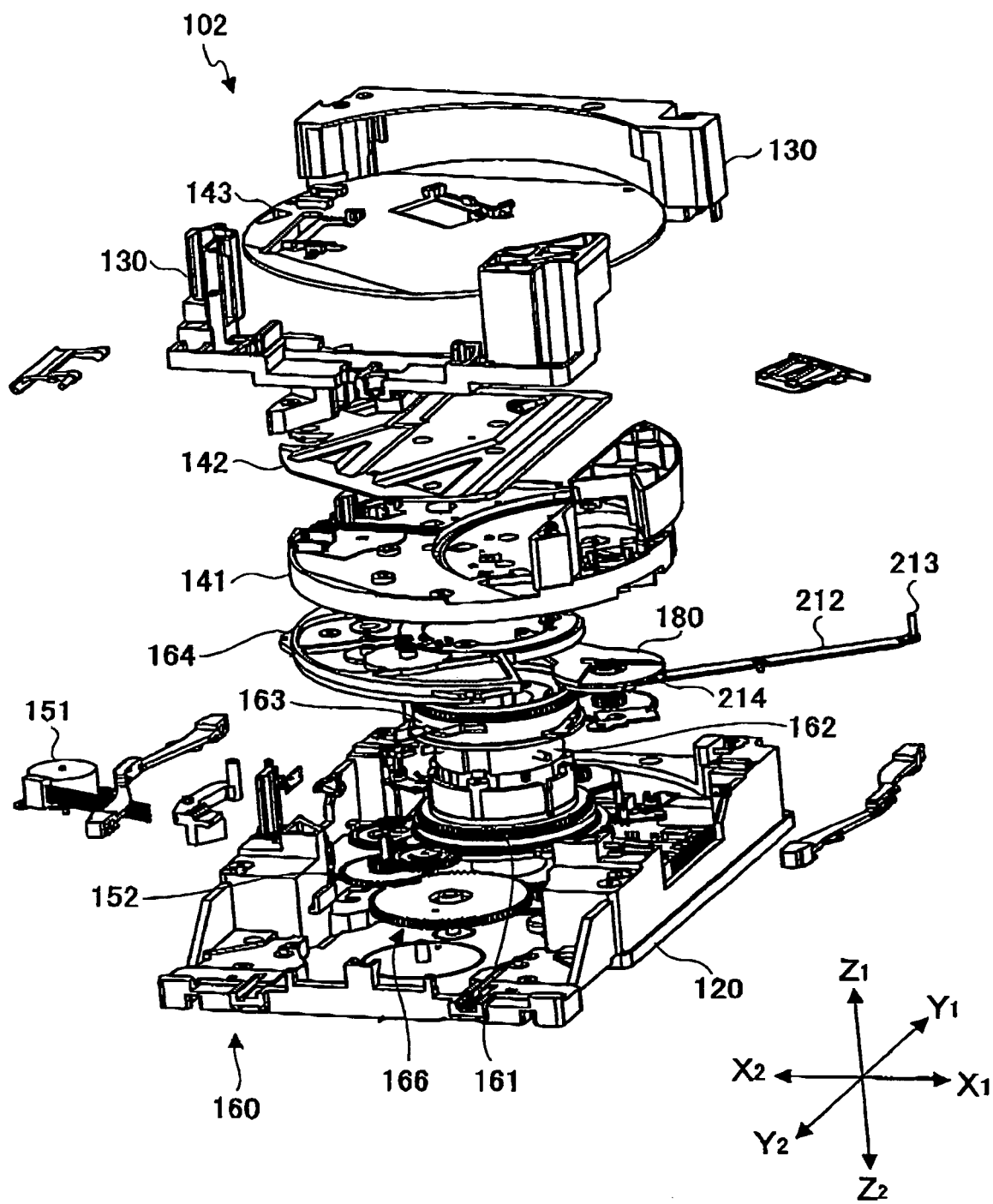
FIG. 9 is an exploded perspective view illustrating the media cartridge picker.
Figure 10:
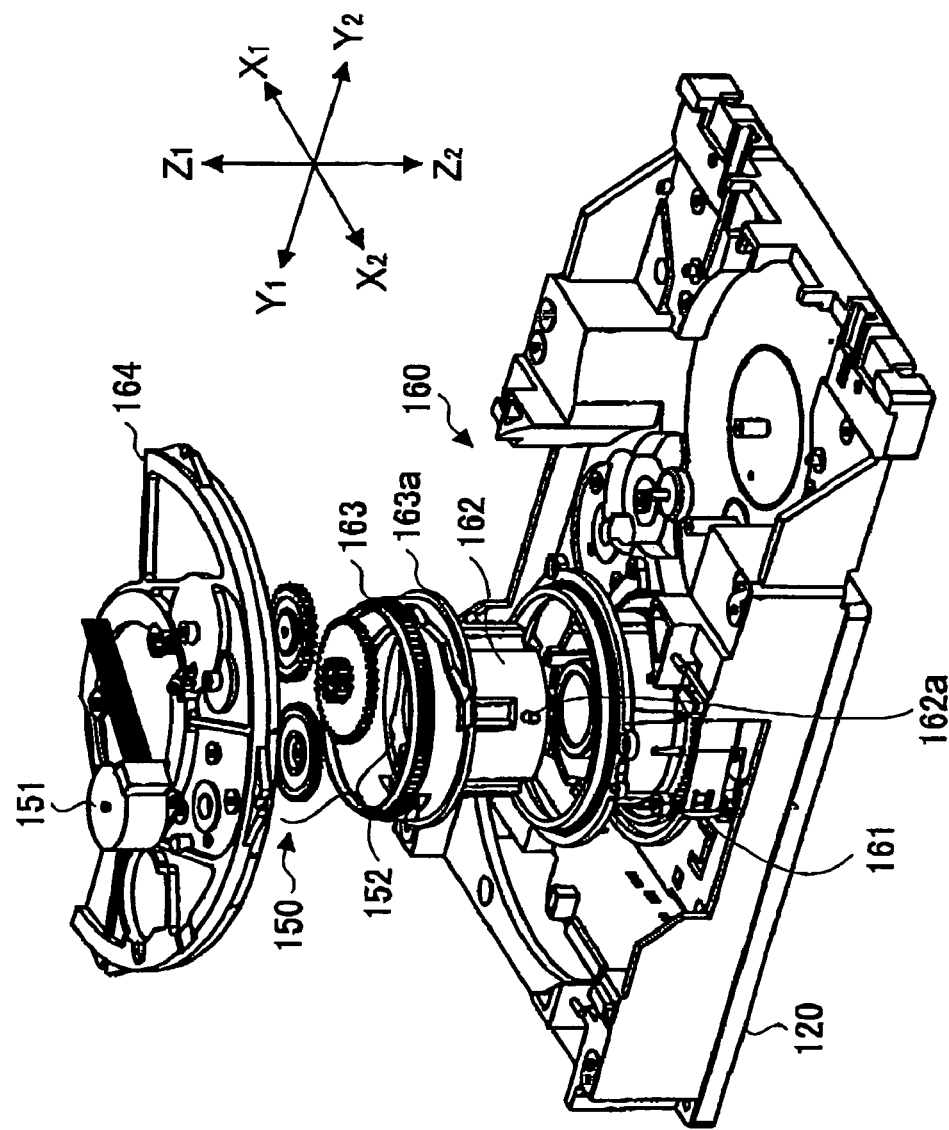
FIG. 10 is an exploded perspective view illustrating a turntable lifting mechanism in detail.

FIG. 7 illustrates the tape cartridge picker 102 with an upper plate 143 of the turntable 140 removed. FIG. 8 illustrates the tape cartridge picker 102 with a pillar 130 and the turntable 140 removed. FIG. 9 is an exploded perspective view illustrating the tape cartridge picker 102. FIG. 10 illustrates the turntable lifting mechanism 150 in detail.

The tape cartridge picker 102 includes the pillar 130 mounted on the base 120, the turntable 140 (FIG. 11) configured to support the tape cartridge 10, the turntable lifting mechanism 150 (FIG. 10) configured to slightly lift and lower the turntable 140 for height position adjustment, and a turntable rotating mechanism 160 configured to rotate the turntable 140 at a predetermined rotational increment, such as approximately every 90 degrees, for example. The tape cartridge picker 102 has ports 131X1, 131X2, 131Y1, and 131Y2 on four sides thereof (see FIG. 7).

A rotating ring gear 161, a cylindrical stand 162, a lifting ring gear 163, and a sub base 164 are disposed on the base 120. The rotating ring gear 161 is rotatably attached to the base 120. The cylindrical stand 162 is arranged at the inner side of the rotating ring gear 161 and the lifting ring gear 163 so as to be rotated along with the rotating ring gear 161 and be lifted independently from the rotating ring gear 161. The lifting ring gear 163 is arranged at the upper side of the rotating ring gear 161 so as to be rotated independently from the rotating ring gear 161. A boss 162a (FIG. 10) of the cylindrical stand 162 is configured to engage a diagonal groove 163a of the lifting ring gear 163. The cylindrical stand 162 is rotated by rotation of the rotating ring gear 161, and lifted/lowered by rotation of the lifting ring gear 163. The sub base 164 is a semi-circular plate fixed to a position slightly separated from and at the upper side of the base 120.

Figure 11:
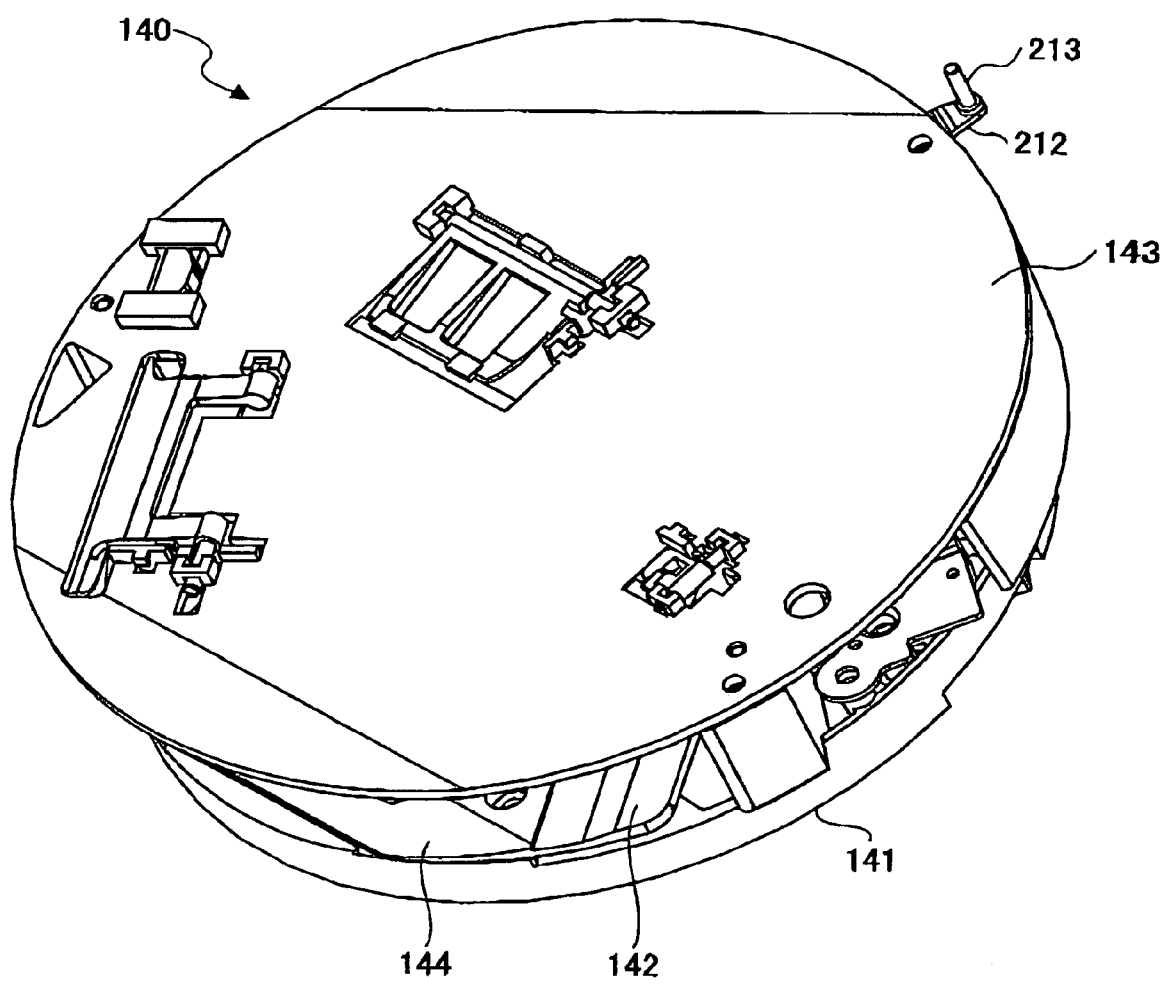
FIG. 11 is a perspective view illustrating the turntable.

Referring to FIG. 11, the turntable 140 includes a base plate 141, a floor plate 142, the upper plate 143, and a clearance 144 between the floor plate 142 and the upper plate 143 to receive the tape cartridge 10. The base plate 141 is screwed onto the cylindrical stand 162 (FIG. 10).

Referring to FIG. 10, the lifting mechanism 150 includes a stepping motor 151, a gear train 152, and the lifting ring gear 163. Both the stepping motor 151 and the gear train 152 are provided on the base plate 141.

As shown in FIG. 8, the turntable rotating mechanism 160 includes a stepping motor 165, a reduction gear train 166, and the rotating ring gear 161, all of which are provided on the sub base 164 (FIG. 9). A two-stage gear 166-3, which is the last stage gear of the reduction gear train 166, comprises a large-diameter gear section 166-3a and a small-diameter gear section 166-3b.

The lifting mechanism 150 has a function of initializing the turntable 140 by lifting/lowering the turntable 140 to a home position thereof in the Z direction. The turntable rotating mechanism 160 has a function of initializing the turntable 140 by rotating the turntable 140 to the home position in the rotation direction. The home position of the turntable 140 is a position where a y-axis (described later) becomes parallel to the Y-axis. The lifting mechanism initialization operation and the turntable rotating mechanism initialization operation apply a method of moving an object to an operation end position defined as a reference position, and then moving the object back by a predetermined distance. The same method is applied to operations for initializing a tape cartridge transport mechanism 170 (described below).

Figure 12:
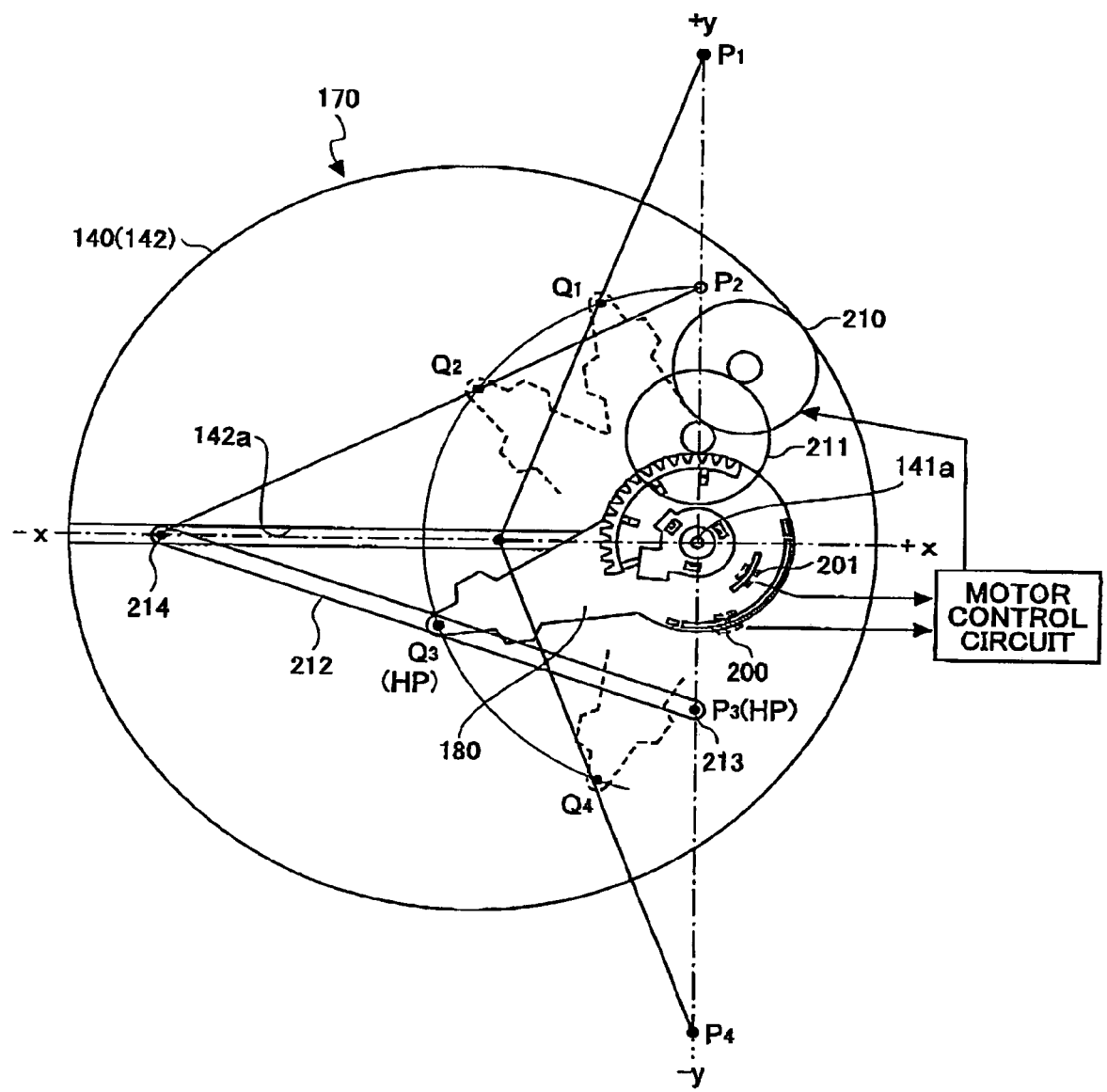
FIG. 12 is a schematic illustration showing a media cartridge transport mechanism.

Referring to FIG. 10, the turntable 140 includes the base plate 141, the floor plate 142, the upper plate 143, and the clearance 144 between the floor plate 142 and the upper plate 143 to receive the tape cartridge 10. Referring to FIG. 12, the turntable 140 has coordinates applied wherein the position of a pin 141a (to be described below) is defined as the origin, a guide groove 142a (to be described below) is defined as an x-axis, and an axis passing through the origin and being orthogonal to the x-axis is defined as a y-axis.

The tape cartridge transport mechanism 170 and a stepping motor 210 (described later), both shown in FIG. 12, are provided on the base plate 141 (FIG. 11).

The tape cartridge transport mechanism 170 moves the tape cartridge 10 between a position on the turntable 140, i.e., a position inside the clearance 144, and a position outside the tape cartridge picker 102. In one embodiment, this movement of the tape cartridge is substantially linear. Alternatively, this movement of the tape cartridge can be non-linear or can include both linear and non-linear movements. The tape cartridge transport mechanism 170 includes a rotary arm 180 rotatably attached to the pin 141a formed on the base plate 141, the stepping motor 210 (FIG. 12) configured to reciprocally rotate the rotary arm 180 between positions Q1 and Q4 within a predetermined angular ranges a reduction gear mechanism 211 configured to transmit the rotation of the motor 210 at a reduced rotation rate to the rotary arm 180, and a lever 212 with a center part rotatably connected to a tip end of the rotary arm 180. A cartridge pin 213 is vertically fixed to an end of the lever 212, while a pin 214 is fixed to the other end of the lever 212. The pin 214 engages a guide groove 142a formed on a lower face of the floor plate 142. In one embodiment, the guide groove 142a can be substantially linear. Alternatively, the guide groove 142a can be curved or can combine a linear and non-linear configuration.

In one embodiment, the turntable rotating mechanism 160 can rotate the turntable 140 by a predetermined rotational increment, such as approximately every 90 degrees, for example, in the clockwise direction or the counterclockwise direction with respect to the home position such that the orientation of the tape cartridge 10 is changed. In non-exclusive alternative embodiments, the turntable 140 can be rotated greater than or less than 90 degrees in either direction. The tape cartridge transport mechanism 170 retrieves the tape cartridge 10 and transports it onto and off of the turntable 140 (see FIG. 3) while the cartridge pin 213 is engaged in the notch 15a of the tape cartridge 10 (FIG. 1).

4 [Configuration of Tape Cartridge Transport Magazine Drive 300] (FIGS. 4-6, FIGS. 13-20)

Figure 13:
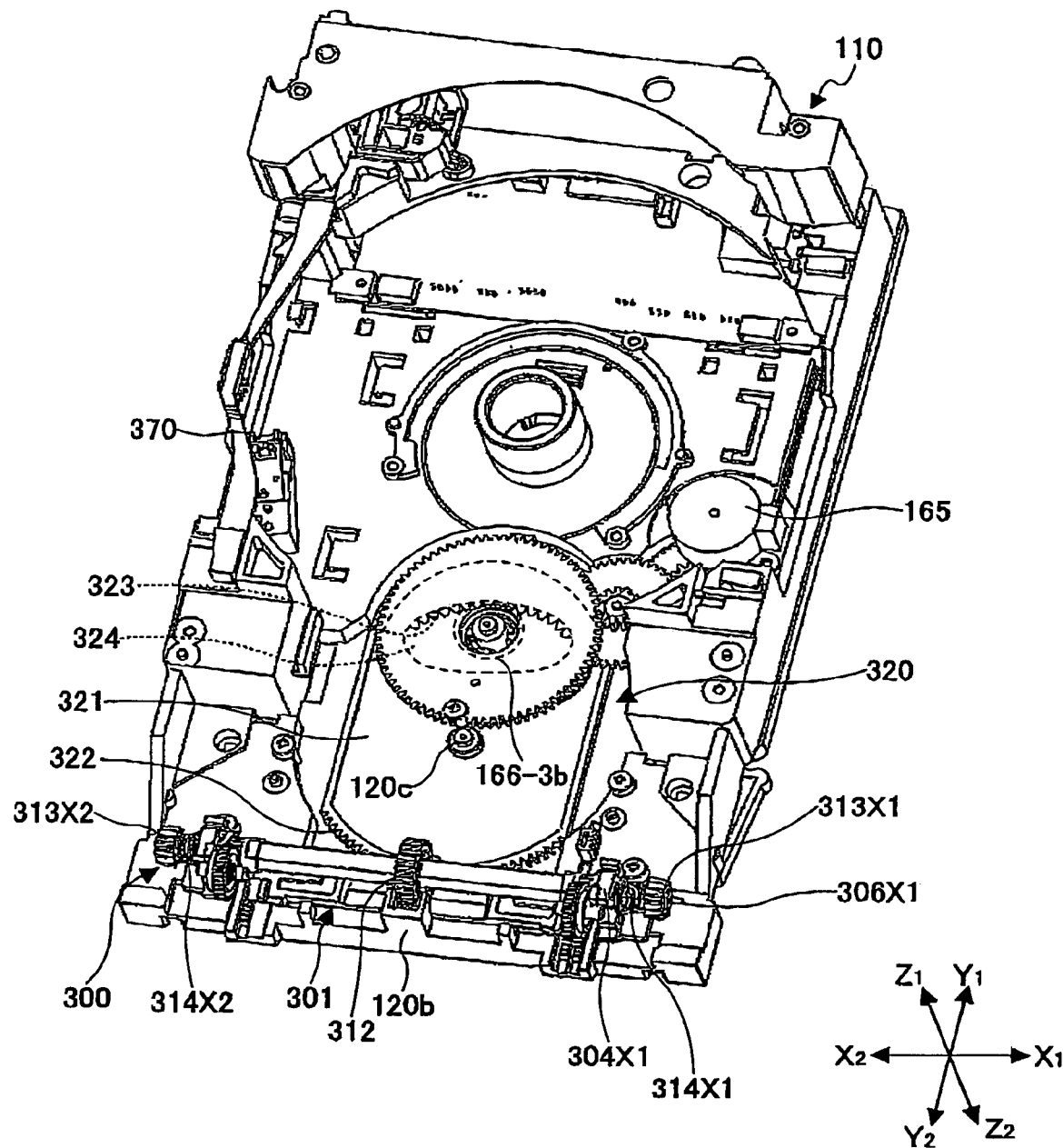
FIG. 13 is a perspective view of the main module with the cartridge picker, a mail slot module, and a motor module removed, viewed from a Y2 side.
Figure 14:
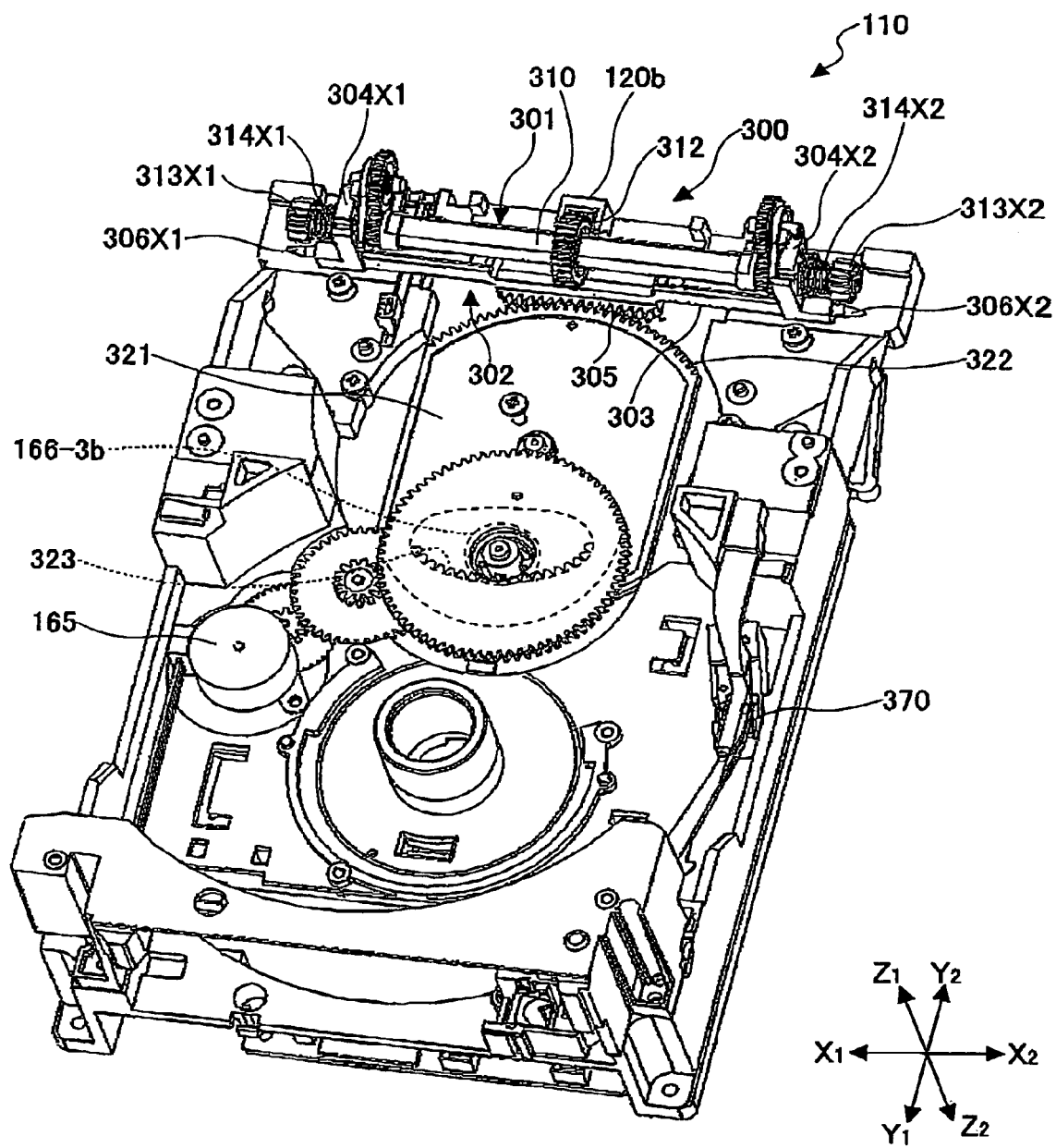
FIG. 14 is a perspective view of the main module of FIG. 13, viewed from the Y1 side.
Figure 15:
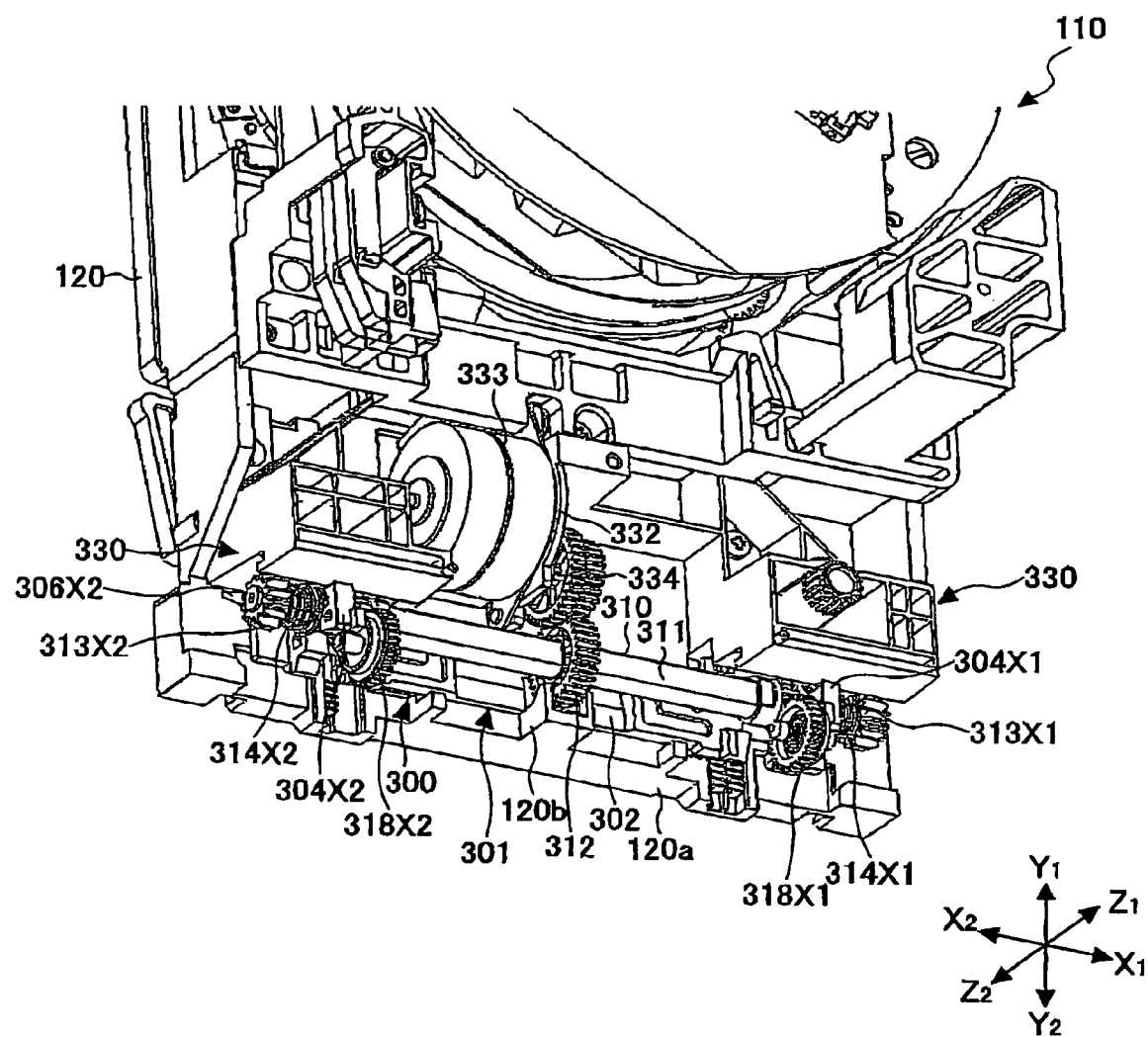
FIG. 15 is a perspective view of a Y2-side part of the main module with the mail slot module removed, viewed obliquely from an X2 side.
Figure 16:
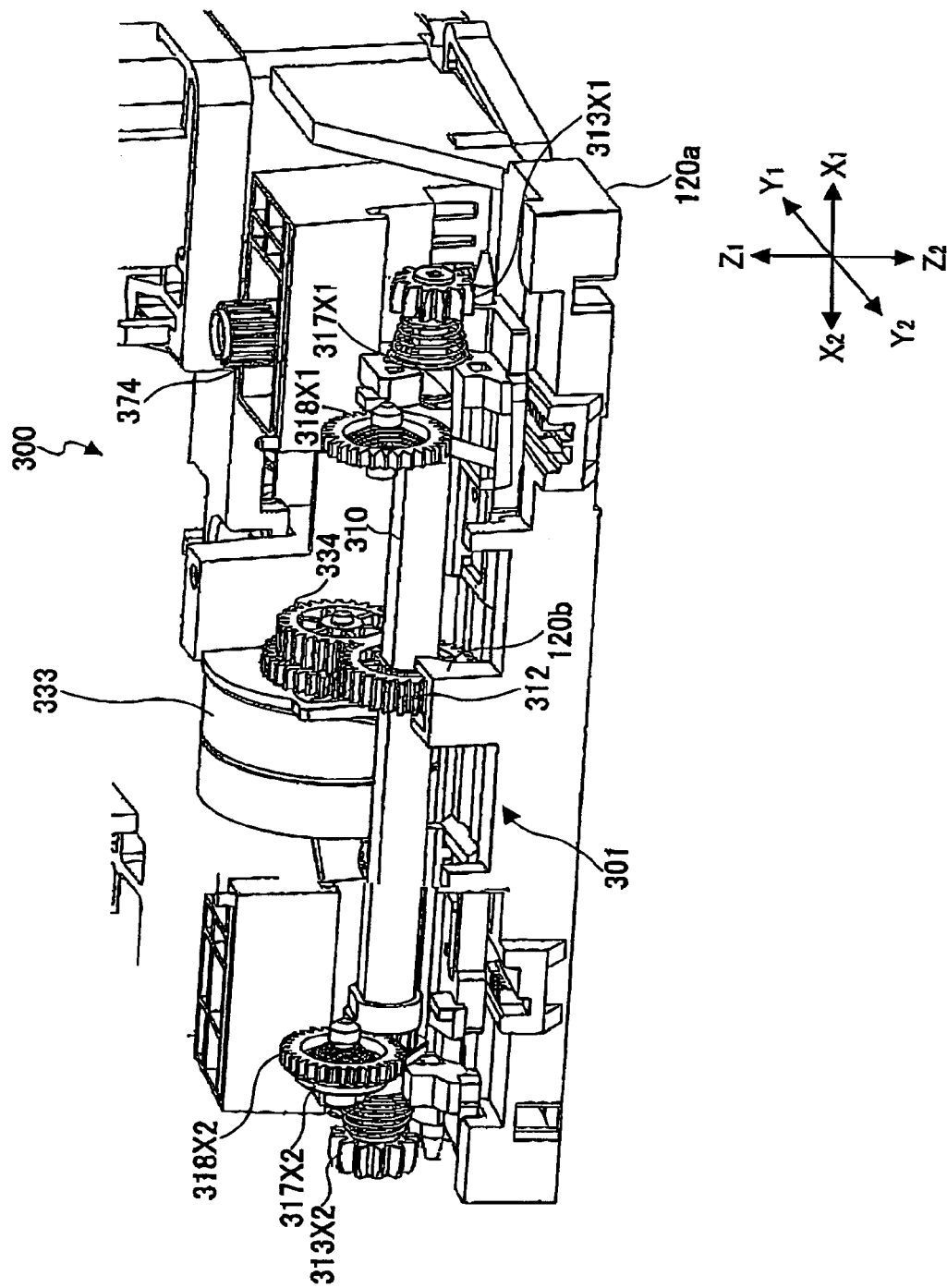
FIG. 16 is a perspective view illustrating a magazine drive with a drive shaft unit located at a home position.
Figure 17:
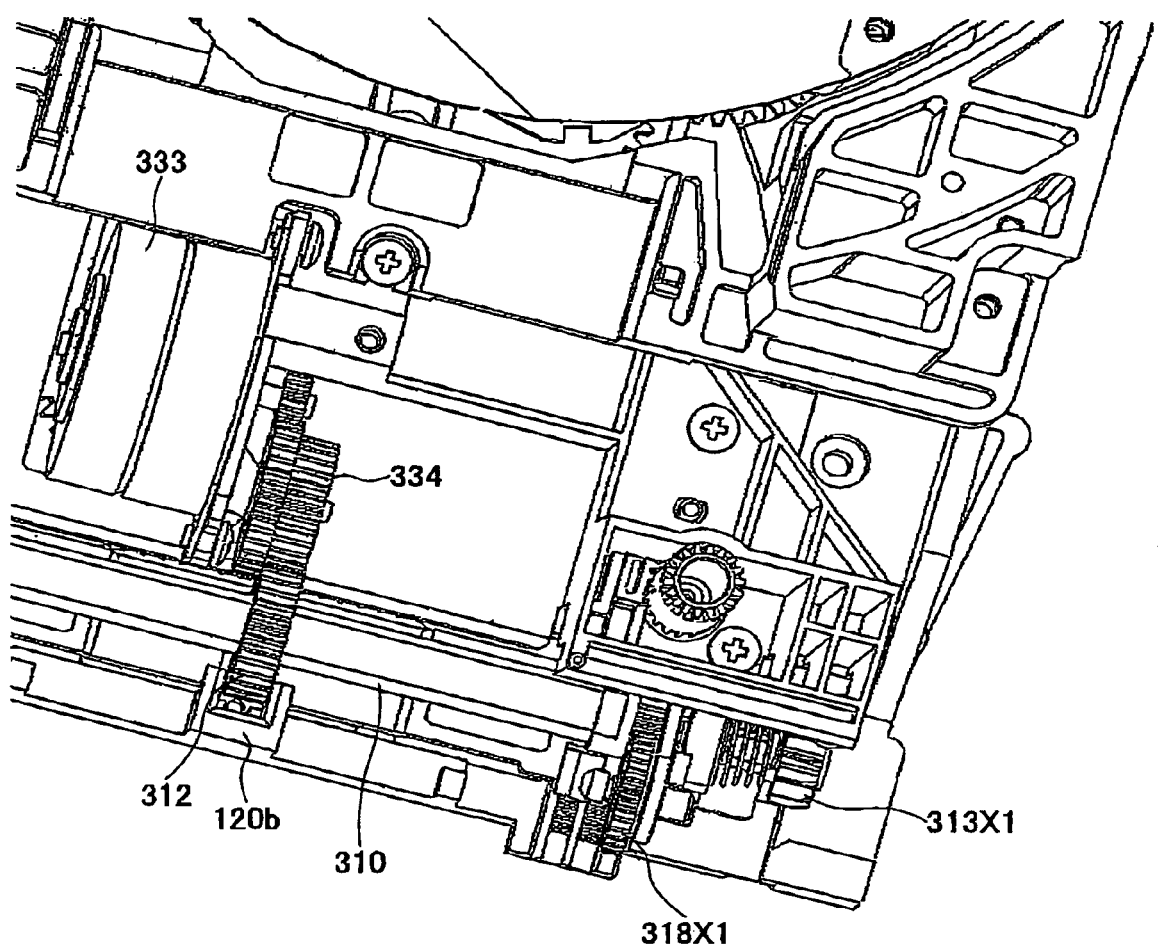
FIG. 17 is a perspective view showing an X1-side portion of the Y2-side part of the main module with the mail slot module removed.
Figure 18:
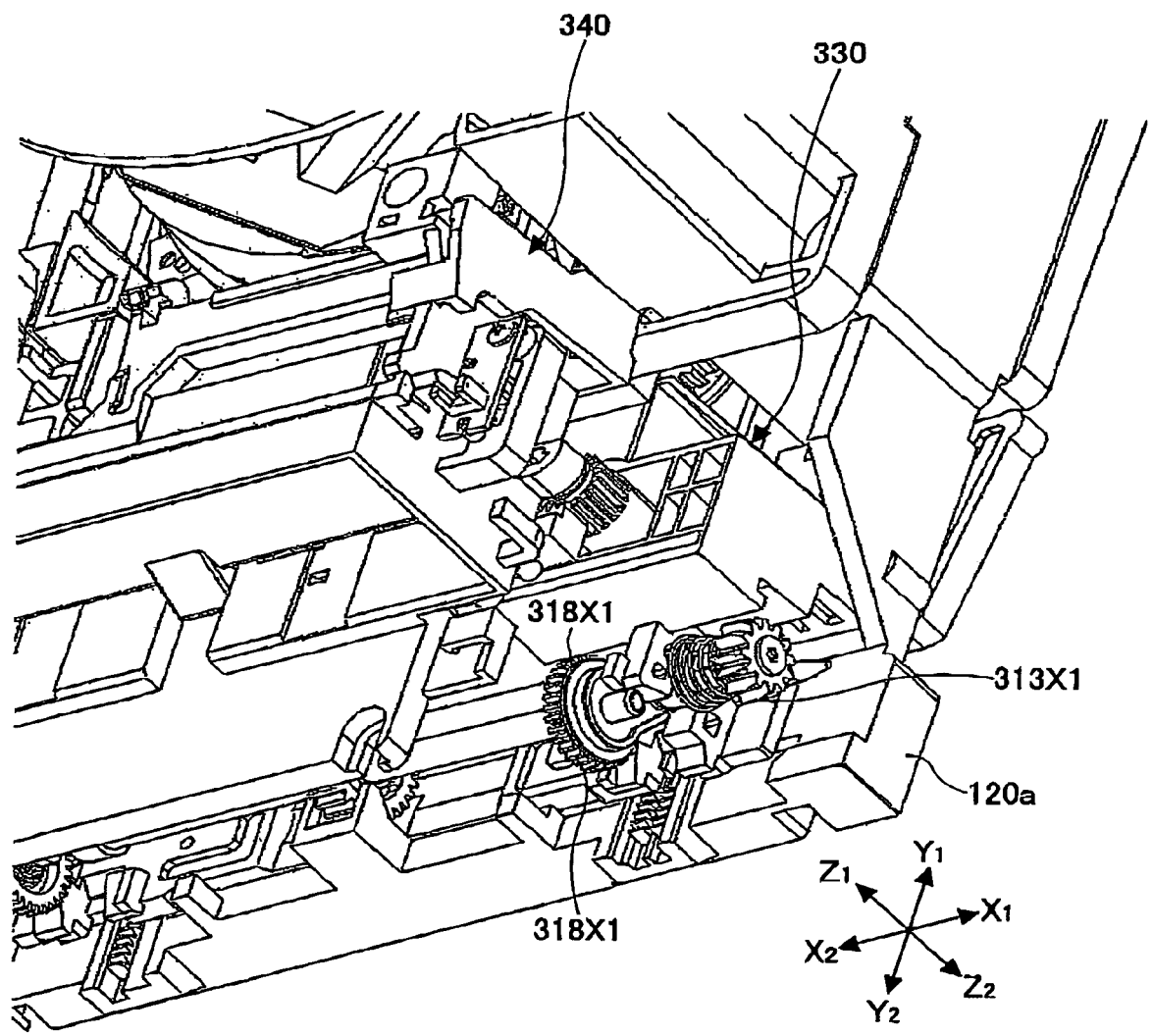
FIG. 18 is a perspective view of the Y2-side part of the main module, viewed obliquely from an X1 side.

FIG. 13 is a perspective view of the main module 110 with the tape cartridge picker 102, the mail slot module 340, and the motor module 330 removed, viewed from the Y2 side. FIG. 14 is a perspective view of the main module 110 of FIG. 13, viewed from the Y1 side. FIG. 15 is a perspective view of a Y2-side part of the main module 110 with the mail slot module 340 removed.

With reference to FIGS. 4, 5, and 13-15, the magazine drive device 300 comprises the drive shaft unit 301, the drive shaft unit shifting mechanism 320, and the magazine drive motor module 330.

4-1 [Configuration of Drive Shaft Unit 301]

Referring to FIGS. 5, 6, and 13-18, the drive shaft unit 301 comprises a frame 302, a drive shaft 310, a center gear 312, drive gears 313X1 and 313X2 disposed one on each end, and is installed on the base 120 movably in the X1-X2 direction. FIGS. 5, 6, and 13-18 show the drive shaft unit 301 located at its home position.

Figure 19:
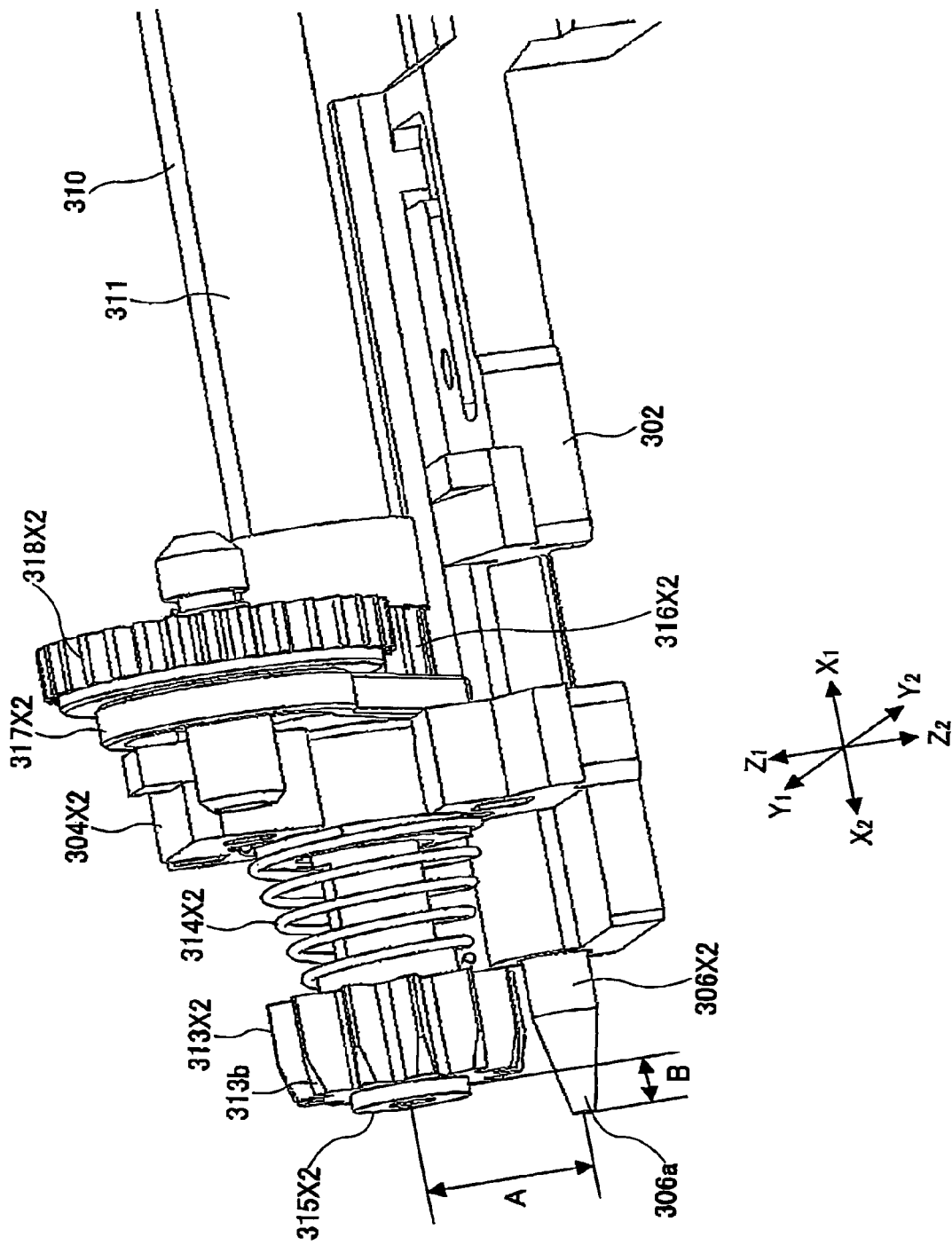
FIG. 19 is an enlarged perspective view showing a drive gear and a positioning pin disposed at the X2 side.

The frame 302 (FIG. 15) comprises a frame main body 303 (FIG. 14) elongated in the X1-X2 direction, flanges 304X1 and 304X2 formed one at each end of the frame main body 303, a rack 305 (FIG. 14) at the center of the frame main body 303, and positioning pins 306X1 and 306X2 provided one on each end of the frame main body 303. Each of the positioning pins 306X1 and 306X2 includes a conical section 306a (FIG. 19). The frame 302 is disposed on the extension 120a of the base 120 movably in the X1-X2 direction.

The drive shaft 310 is rotatably supported at both ends by the flanges 304X1 and 304X2. Gears 316X1 and 316X2 (FIG. 19) are secured to the drive shaft 310 at the inner side of the flanges 304X1 and 304X2. The gears 316X1 and 316X2 prevent the drive shaft 310 from moving with respect to the flanges 304X1 and 304X2 in the X1-X2 direction. The drive shaft 310 has a flat face 311 in its diametrical direction at least at the center and ends thereof so as to have a D-shaped cross section, on which the center gear 312 fits. The drive shaft 310 is configured to rotate with the center gear 312 and is movable in the X1-X2 direction with respect to the center gear 312. In one embodiment, as the center gear 312 is fitted in a holder section 120b formed integrally on the base 120, the movement of the center gear 312 in the X1-X2 direction is restricted.

The drive gears 313X1 and 313X2 are attached to the drive shaft 310 at the outer side of the flanges 304X1 and 304X2, respectively. The drive gears 313X1 and 313X2 are configured to rotate with the drive shaft 310, and are slidable along the drive shaft 310 in the axial direction of the drive shaft 310. Washers 315X2 (FIG. 19) can be threaded on the end faces of the drive shaft 310 to prevent the drive gears 313X1 and 313X2 from dropping off. Compression coil springs 314X1 and 314X2 are wound around the drive shaft 310 between the drive gears 313X1, 313X2 and the flanges 304X1, 304X2, respectively. The drive gear 313X2 compresses the compression coil spring 314X2 to move in the X1 direction when a force in the X1 direction is applied to the drive gear 313X2. The drive gear 313X1 compresses the compression coil spring 314X1 to move in the X2 direction when a force in the X2 direction is applied to the drive gear 313X1.

As shown in detail in FIG. 19, there is a distance A between the positioning pin 306X2 and the drive shaft 310. The positioning pin 306X2 extends further outward than the drive gear 313X2 by a distance B. The drive gear 313X2 is a spur gear having a taper face 313b on the outer end. The drive gears 313X1 and the positioning pin 306X1 also have the configurations as described above.

The drive shaft unit 301 is usually located at a home (center) position shown in FIGS. 4 and 24A. When the drive shaft unit 301 is at the home position, the positioning pins 306X1 and 306X2 are located within the width of the base 120 in the X1-X2 direction.

Swing arms 317X1 and 317X2 are attached to the drive shaft 310 between the gears 316X1, 316X2 and the flanges 304X1, 304X2, respectively. Gears 318X1 and 318X2 are attached to ends of the swing arms 317X1 and 317X2. The gears 31BX1 and 31BX2 mesh with the gears 316X1 and 316X2, respectively. The swing arms 317X1 and 317X2 swing in the same direction as the drive shaft 310 rotates.

4-2 [Configuration of Drive Shaft Unit Shifting Mechanism 320]

The drive shaft unit shifting mechanism 320 utilizes the stepping motor 165 that rotates the turntable 140. The drive shaft unit shifting mechanism 320 comprises the stepping motor 165 and a gear member 321 (see FIGS. 13 and 14).

The gear member 321 has a generally elliptical shape, comprising an outer gear section 322 and an inner gear section 323 along the edge of an inner opening 324. A center hole of the gear member 321 fits on a shaft portion 120c of the base 120. The inner gear section 323 meshes with the small-diameter gear section 166-3b, while the outer gear section 322 meshes with the rack 305 (FIG. 14).

When the stepping motor 165 is driven, the turntable 140 is rotated through the gear train 166. At the same time, the gear member 321 is rotated thought the small-diameter section 166-3b in the clockwise direction or the counterclockwise direction in accordance with the rotational direction of the stepping motor 165, so that the drive shaft unit 301 is moved through the rack 305 in the X2 direction or the X1 direction.

Figure 20:
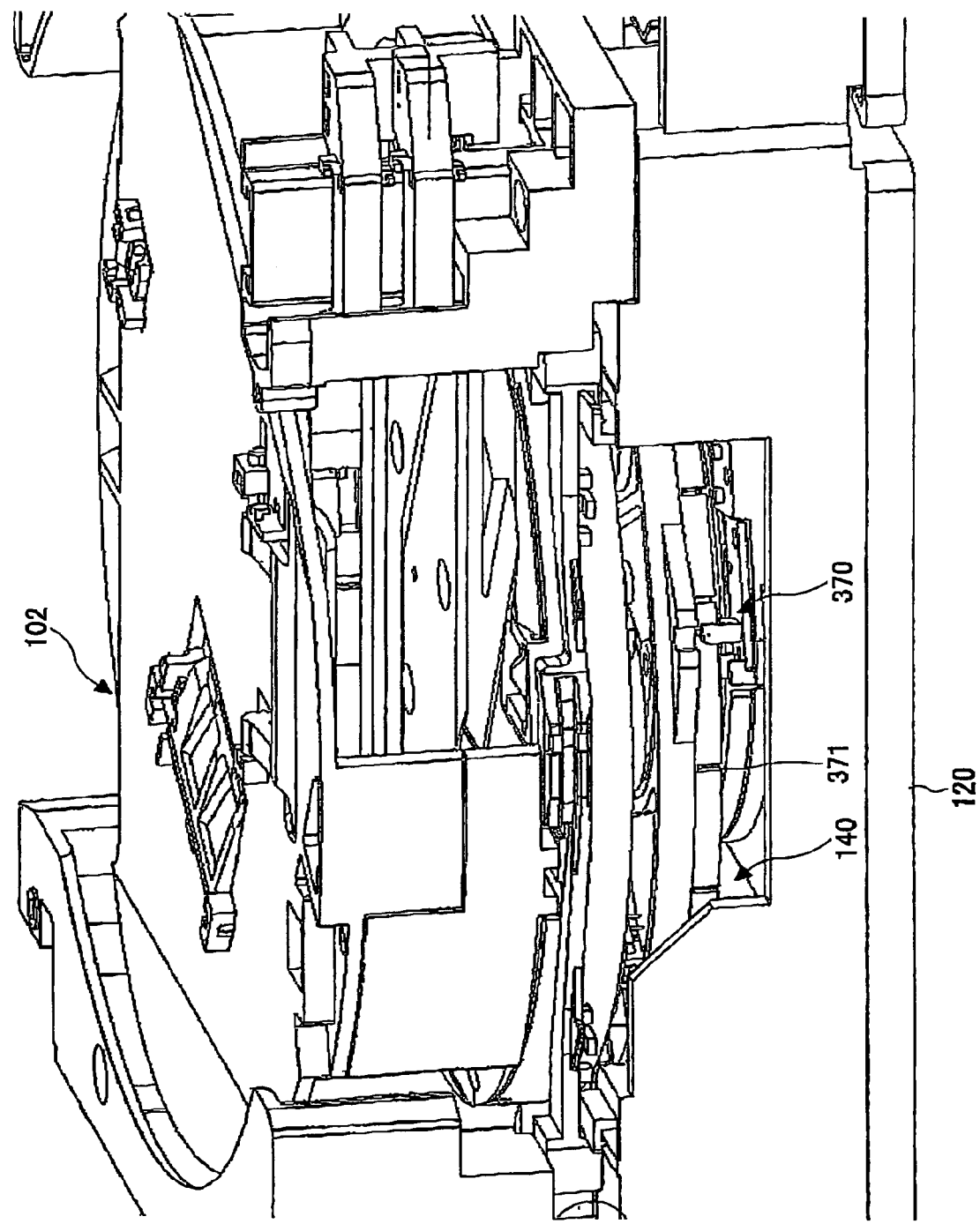
FIG. 20 shows a photo sensor for detecting the rotation angle of the turntable.

Referring to FIG. 20, the photo sensor 370 for detecting the rotating angle of the turntable 140 is provided. The photo sensor 370 detects the rotating angle of the turntable 140 by detecting slits 371, which can be formed in a predetermined arrangement on a rib around a lower face of the turntable 140. In one non-exclusive embodiment, the rotating angle of the turntable 140 and the moving distance of the drive shaft unit 301 can have the following relation; When the rotating angle of the turntable 140 is approximately 15 degrees, the moving distance of the drive shaft unit 301 is approximately 2.5 mm; when the rotating angle of the turntable 140 is approximately 30 degrees, the moving distance of the drive shaft unit 301 is approximately 5 mm; and when the rotating angle of the turntable 140 is approximately 90 degrees, the moving distance of the drive shaft unit 301 is approximately 15 mm. However, it is recognized that other suitable arrangements can be utilized with the present invention depending upon the design requirements of the autoloader.

4-3 [Configuration of Magazine Drive Motor Module 330]

As shown in FIG. 5, in the magazine drive motor module 330, the magazine drive motor 333 is secured to a flange section 332 of a frame 331. A reduction gear 334 is held in the flange section 332. The reduction gear 334 meshes with a gear 335 secured to a spindle of the magazine drive motor 333.

The magazine drive motor module 330 is secured to the Y1-side end of the base 120 such that the reduction gear 334 meshes with the gear 312 as shown in FIG. 15.

When the magazine drive motor 333 is driven, the gear 312 is rotated through the reduction gear 334. Accordingly, the drive shaft 310 and the drive gears 313X1 and 313X2 are rotated.

Figure 21:
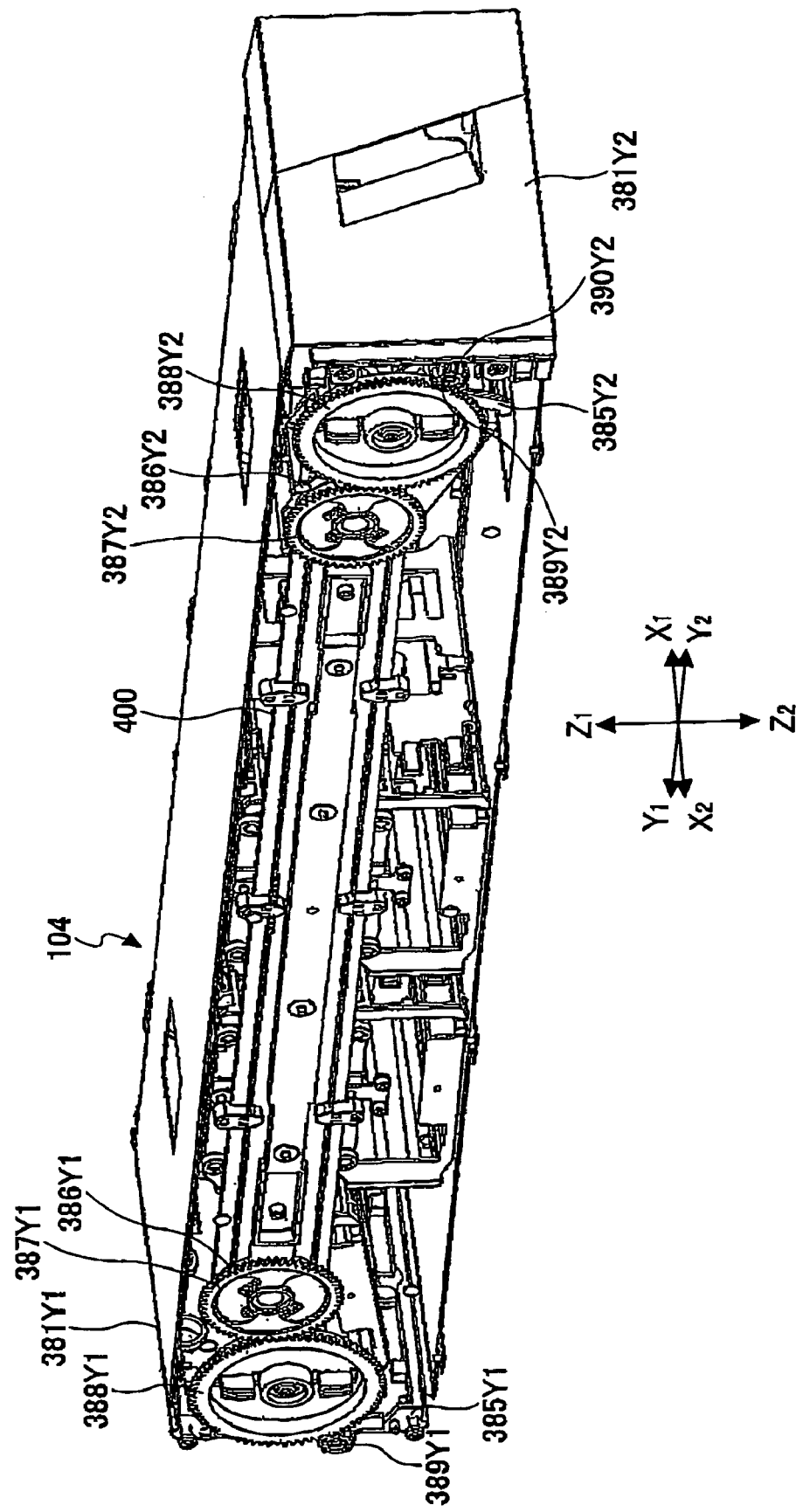
FIG. 21 is a perspective view of the media cartridge transport magazine with an X2-side lateral plate removed, viewed from the X2 side.
Figure 22:
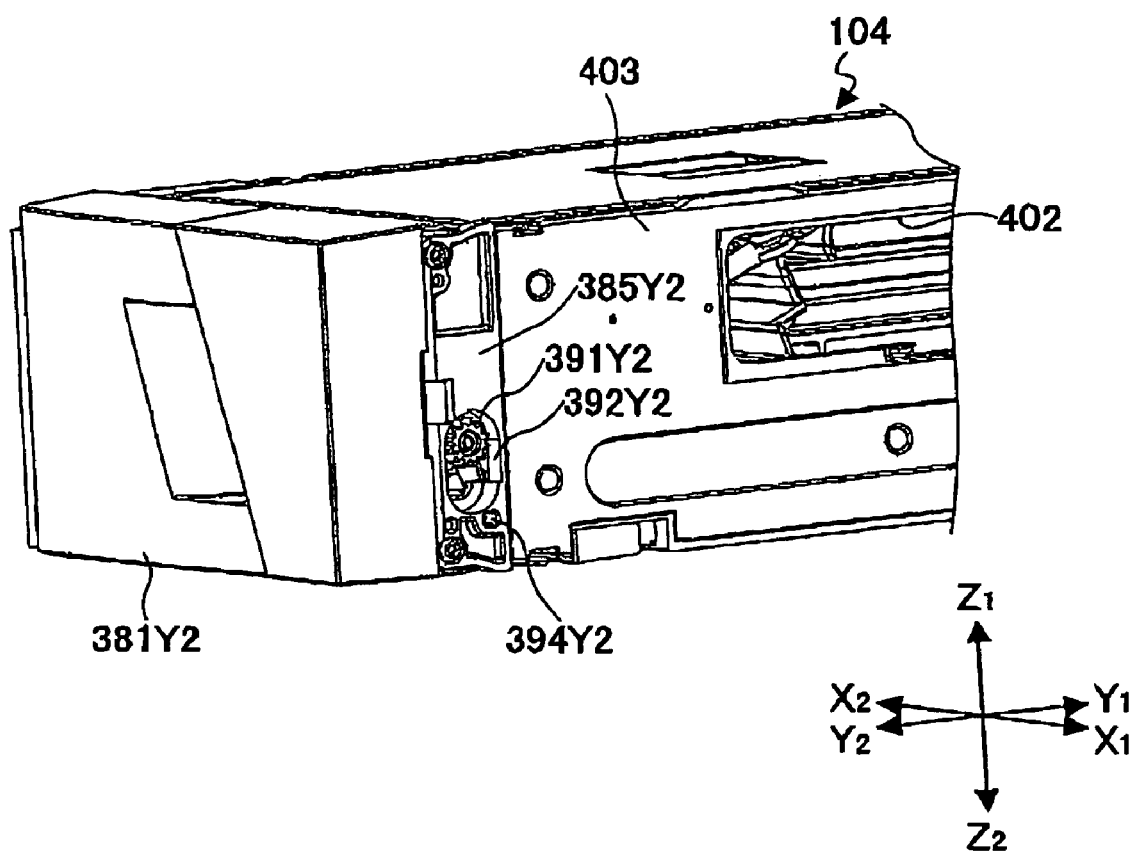
FIG. 22 is a perspective view of the media cartridge transport magazine of FIG. 21, viewed from the X1 side.
Figure 23:
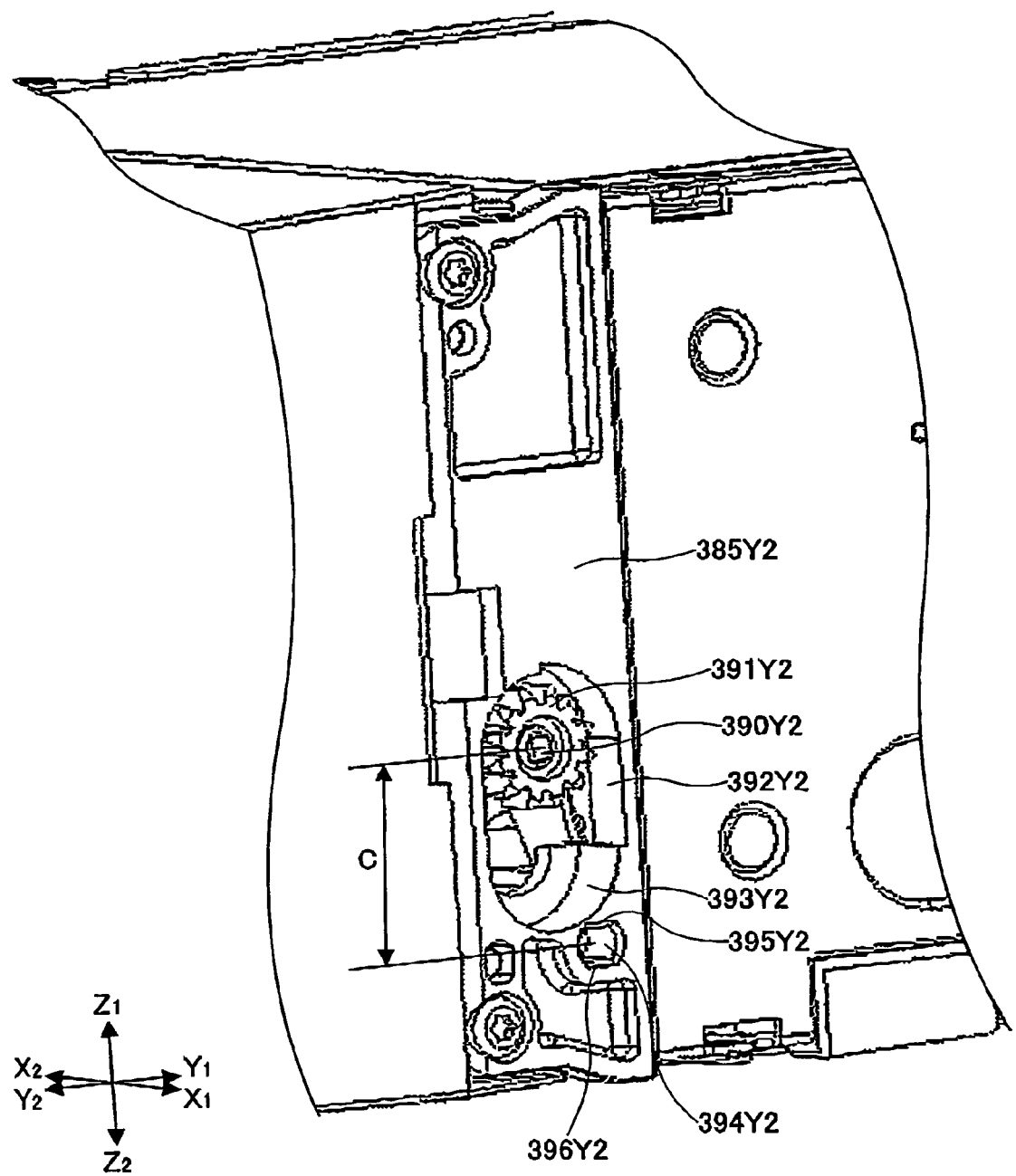
FIG. 23 is an enlarged view illustrating a part of the media cartridge transport magazine of FIG. 22.

5 [Configuration of Tape Cartridge Transport Magazines 103, 104] (FIGS. 21-23)

FIG. 21 is a perspective view of the tape cartridge transport magazine 104 with an X2-side lateral plate removed, viewed from the X2 side. FIG. 22 is a perspective view of the tape cartridge transport magazine 104 of FIG. 21, viewed from the X1 side. FIG. 23 is an enlarged view illustrating a part of the tape cartridge transport magazine 104 of FIG. 22.

Referring to FIG. 21, the tape cartridge transport magazine 104 is a quadrangular prism elongated in the Y1-Y2 direction and comprises decorative panels 381Y1 and 3B1Y2 at opposing ends in the longitudinal direction. In one embodiment, the tape cartridge transport magazine 104 can be installable at both the X1 side and the X2 side of the main module 110 by reversing the longitudinal orientation without turning it upside down. Alternatively, the tape cartridge transport magazine 104 can be positioned and/or oriented differently relative to the main module 110.

As shown in FIG. 21, a frame 385Y2, a pulley 386Y2, a large-diameter gear member 388Y2 that meshes with a gear section 387Y2 provided at the end of the pulley 386Y2, and a small-diameter gear member 389Y2 that meshes with the large-diameter gear member 388Y2 are provided at the Y2 side. The small-diameter gear member 389Y2 is secured to an end of a rotary shaft 390Y2.

As shown in FIGS. 22 and 23, a small-diameter magazine gear 391Y2 is secured to the opposite end of the rotary shaft 390Y2. An opening 392Y2 elongated in the Z direction is formed in the frame 385Y2. The magazine gear 391Y2 is exposed from a Z1-side part of the opening 392Y2. The opening 392Y2 includes an opening portion 393Y2 having a size that allows the drive gear 313X2 to be fitted therein. A positioning hole 394Y2 is formed at the Z2 side of the opening portion 393Y2 in the frame 385Y2. The positioning hole 394Y2 is elongated in the Y1-Y2 direction and includes linear edges 395Y2 and 396Y2 at the Z1 side and the Z2 side, each extending in the Y1-Y2 direction The positioning hole 394Y2 is formed at the Z2 side of the magazine gear 391Y2 with a distance C therebetween (see FIG. 28A). The distance C is determined based on the distance A, a pitch circle diameter D1 of the magazine gear 391Y2, and a pitch circle diameter D2 of the drive gear 313X2 such that the center distance between the magazine gear 391Y2 and the drive gear 313X2 is set to an appropriate value E when the positioning pin 306X2 (FIG. 19) is fitted in the positioning hole 394Y2.

Referring back to FIG. 21, a frame 385Y1, a pulley 386Y1, a gear section 387Y1, a large-diameter gear member 388Y1, a small-diameter gear member 389Y1, and a magazine gear are provided at the Y1 side similar to the Y2 side.

Plural tape cartridge containers 401 are disposed at even intervals on a belt 400 extending around the pulleys 386Y1 and 386Y2 (see FIGS. 2 and 21)

An opening 402 (FIG. 22) having a size corresponding to the tape cartridge 10 is formed in an X2-side lateral plate 403 of the magazine 104 so as to oppose the tape cartridge picker 102 when the magazine 104 is mounted. Also, openings (not shown) for inserting tape cartridges 10 are formed in the lateral plate 403 of the magazine 104 so as to oppose the corresponding tape cartridge containers 401 (FIG. 2).

Figure 25:
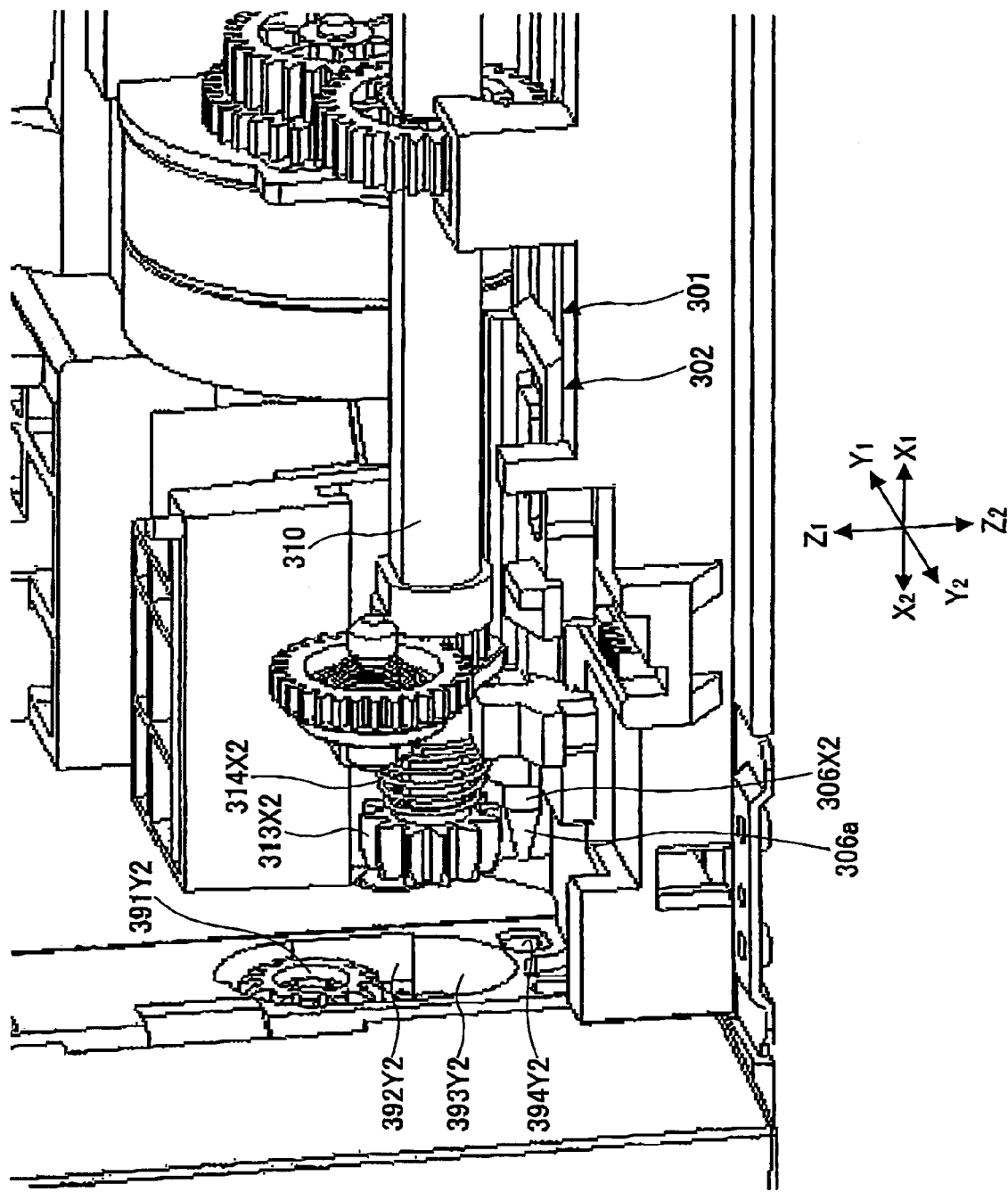
FIG. 25 illustrates an X2-side part of the drive shaft unit opposing a magazine in the initial state.

When the tape cartridge transport magazines 103 and 104 are attached at the X1 side and the X2 side as shown in FIG. 1, the drive shaft unit 301 can be located at the home position shown in FIG. 24A. At the X2 side, as shown in FIG. 25, the magazine gear 391Y2, the opening 392Y2, and the positioning hole 394Y2 oppose the drive gear 313X2 (313X1) and the positioning pin 306X2 (306X1). The opening 402 opposes the tape cartridge picker 102.

6 [Operations for Selectively Driving Tape Cartridge Transport Magazines 103, 104] (FIGS. 24A-29D)

FIG. 24B shows a state to drive the tape cartridge transport magazine 104. FIG. 24C shows a state to drive the tape cartridge transport magazine 103.

When a command to drive the tape cartridge transport magazine 104 is input, the stepping motor 165 is driven in the normal direction by the motor control circuit 410 so as to drive the magazine drive motor 333 (see FIG. 4).

When the stepping motor 165 is driven, the turntable 140 is rotated in the counterclockwise direction through the reduction gear train 166 (FIG. 9). At the same time, the drive shaft unit 301 is driven in the X2 direction through the gear member 321 (FIG. 13). The stepping motor 165 is stopped at the time when the photo sensor 370 (FIG. 20) detects that the turntable 140 is rotated by a predetermined amount, such as approximately 90 degrees, in the counterclockwise direction. The drive shaft unit 301 is moved in the X2 direction, so the drive gear 313X2 is inserted into the opening portion 393Y2 to mesh with the magazine gear 391Y2. Thus, the magazine drive device 300 establishes a rotation transmission path from the magazine drive motor 333 to the tape cartridge transport magazine 104.

The stepping motor 165 for rotating the turntable 140 is also used for moving the drive shaft unit 301. Therefore, there is no need to provide a stepping motor exclusively used for moving the drive shaft unit 301. It is so designed that the tape cartridge picker 102 is at rest while the tape cartridge transport magazine 104 is driven. According to the present invention, a part of the resting tape cartridge picker 102 is operated for moving the drive shaft unit 301.

As the drive shaft unit 301 is interlocked with the turntable 140, the moving distance of the drive shaft unit 301 is found by detecting the approximate rotating angle of the turntable 140. Therefore, there is no need to provide the drive shaft unit 301 with a mechanism for detecting the moving distance.

Figure 26:
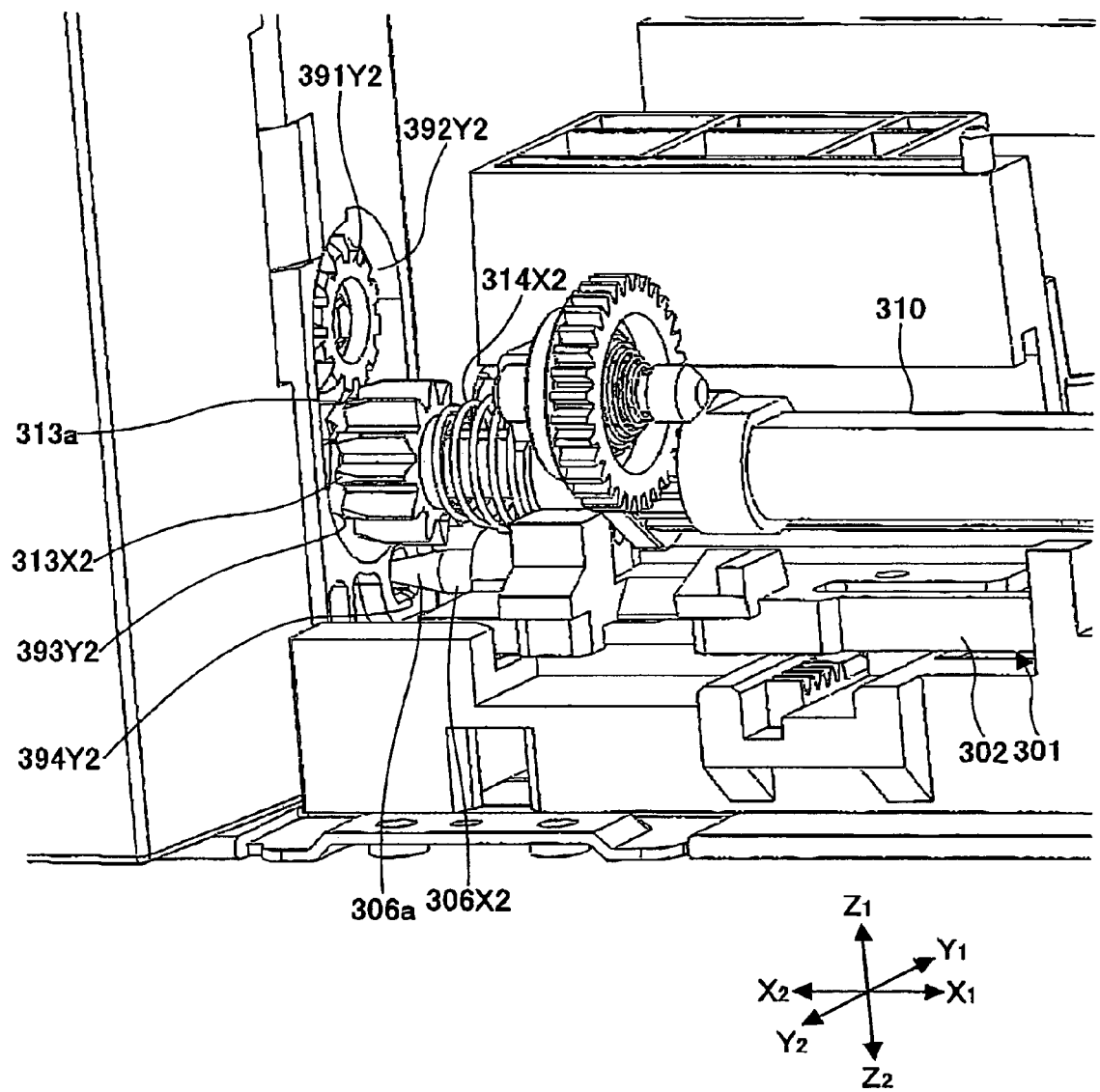
FIG. 26 illustrates the X2-side part of the drive shaft unit in a process of being coupled with the magazine.
Figure 27:
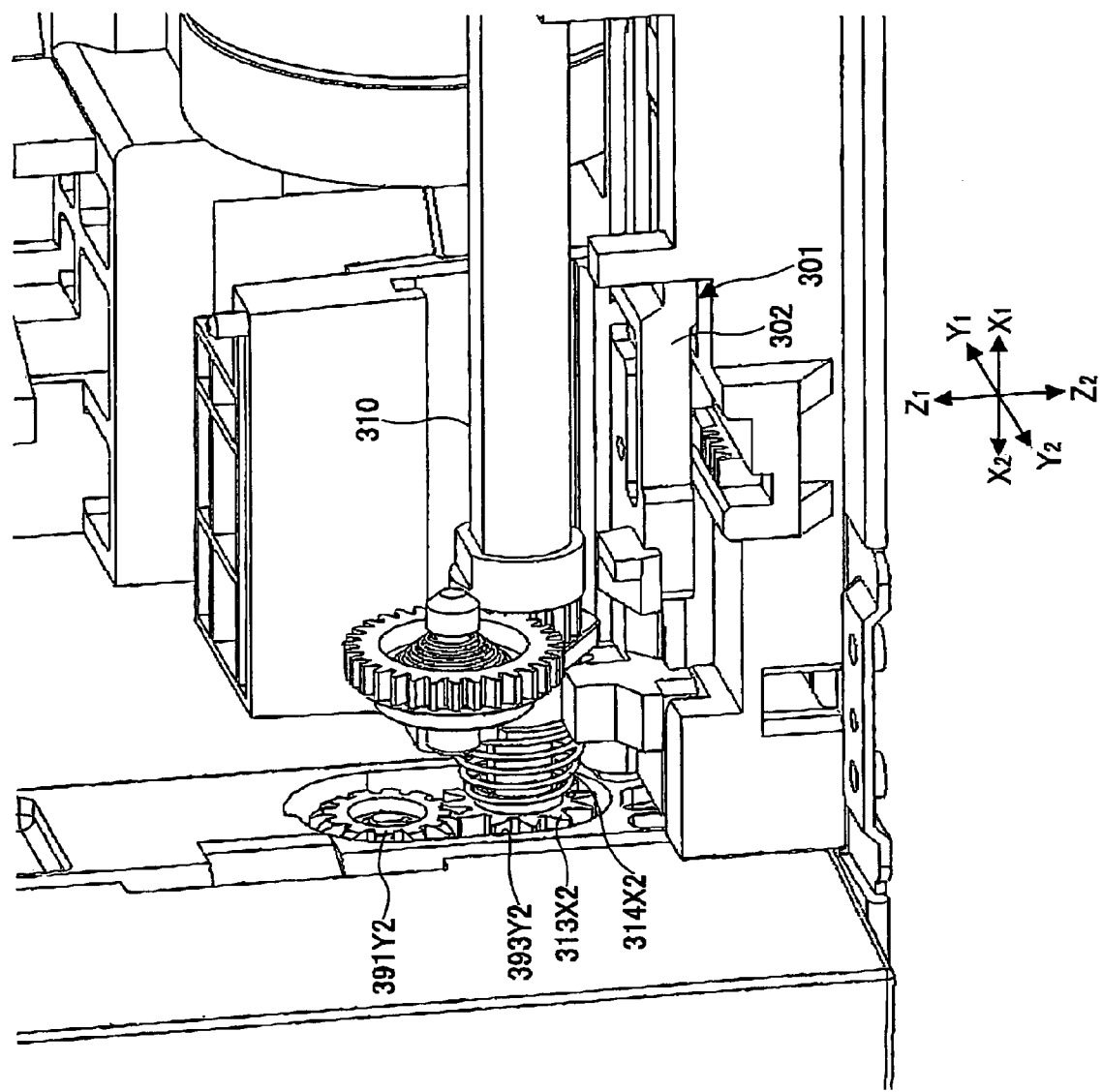
FIG. 27 illustrates the X2-side part of the drive shaft unit coupled with the magazine.

At the final stage of the movement of the drive shaft unit 301 in the X2 direction, the following operations illustrated in FIGS. 26 and 27 are performed.

Figure 28A:
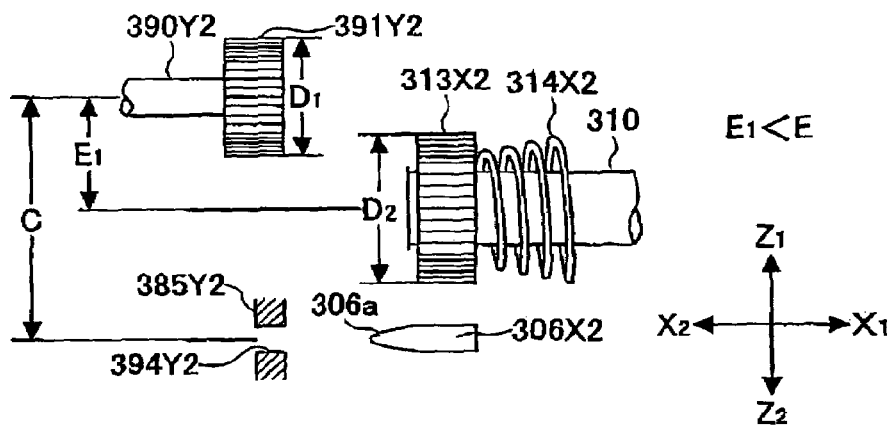
FIG. 28 illustrates operations for correcting a center distance between the drive gear and the magazine gear.
Figure 28B:
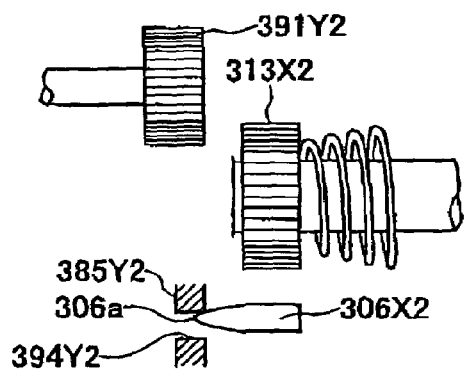
Figure 28C:
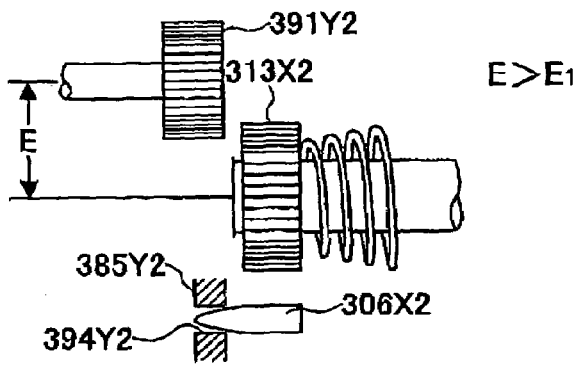
Figure 28D:
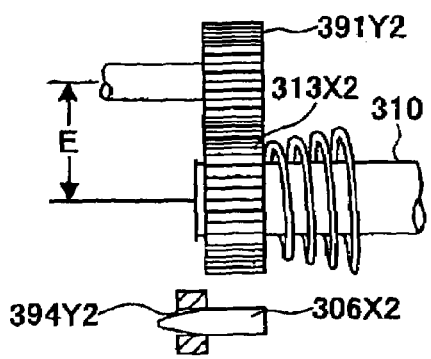

Just before the drive gear 313X2 contacts the magazine gear 391Y2, the positioning pin 306X2 fits into the positioning hole 394Y2 (see FIGS. 26, 28B, and 28C) so as to set the center distance between the magazine gear 391Y2 and the drive gear 313X2 to the appropriate value E (FIG. 28C). When the drive shaft unit 301 is further moved in the X2 direction to be inserted into the opening portion 393Y2 from the lateral side thereof, tooth sections of the drive gear 313X2 fit into tooth groove sections of the magazine gear 391Y2 (see FIGS. 27, 24B, and 28B). Thus, the drive gear 313X2 correctly meshes with the magazine gear 391Y2. The taper face 313b helps the drive gear 313X2 to smoothly mesh with the magazine gear 391Y2.

FIGS. 28A-28D illustrate operations for correcting the center distance between the drive gear 313X2 and the magazine gear 391Y2 to the appropriate value E just before the drive gear 313X2 meshes with the magazine gear 391Y2.

FIG. 28A illustrates the magazine gear 391Y2 and the drive gear 313X2 located at the positions shown in FIGS. 24A and 25. Supposing that the center distance between the magazine gear 391Y2 and the drive gear 313X2 is a value E1 smaller than the appropriate value E. This situation may occur when, for example, the frame 500 is distorted at the time of mounting the tape cartridge autoloader 100 on the rack or when there is an assembly error in the tape cartridge autoloader 100.

When the drive shaft unit 301 is moved in the X2 direction, a tip end of the conical section 306a of the positioning pin 306X2 is inserted into the positioning hole 394Y2 as shown in FIG. 28B and further inserted as shown in FIG. 28C before the drive gear 313X2 reaches the magazine gear 391Y2. During this process, the drive gear 313X2 is slightly moved in the Z2 direction or the tape cartridge transport magazine 104 is slightly moved in the Z1 direction, so that the center distance between the magazine gear 391Y2 and the drive gear 313X2 is corrected to the appropriate value E. After the center distance is corrected to the appropriate value E, the drive gear 313X2 correctly meshes with the magazine gear 391Y2.

FIGS. 29A-29D illustrate operations for locating the drive gear 313X2 to correctly mesh with the magazine gear 391Y2 when the tooth sections of the drive gear 313X2 contact and interfere with tooth sections of the magazine gear 391Y2.

Figure 29A:
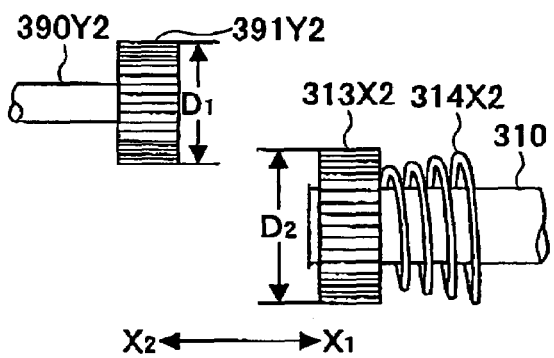
FIGS. 29A-29D illustrate operations to be performed when tooth sections of the drive gear contact and interfere with tooth sections of the magazine gear.
Figure 29B:
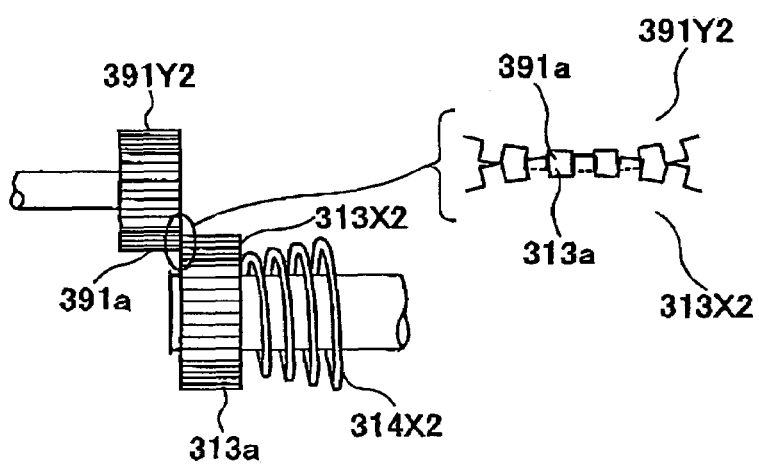

FIG. 29B illustrates the tooth sections of the drive gear 313X2, which are moved in the X2 direction from the original position shown in FIG. 29A, contacting and interfering with the tooth sections of the magazine gear 391Y2.

Figure 29C:
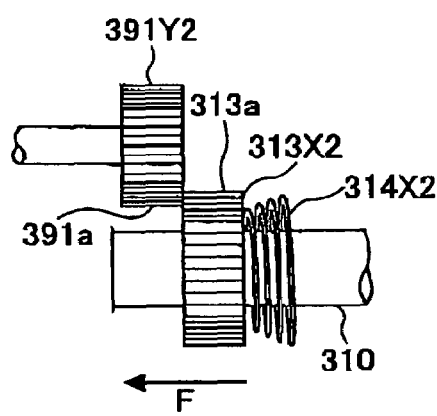
Figure 29D:
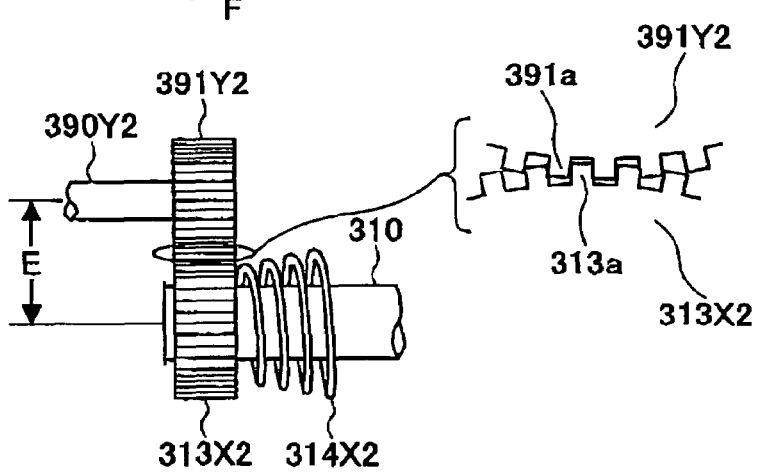

When the drive shaft unit 301 is further moved in the X2 direction, the compression coil spring 314X2 is compressed as shown in FIG. 29C. Thus, the drive shaft unit 301 is moved to the final position. The drive gear 313X2 is stopped with lateral end faces of the tooth sections 313a abutting opposing lateral end faces of the tooth section 391a of the magazine gear 391Y2. Then, the magazine drive motor 333 is started as described below, and accordingly the drive gear 313X2 is rotated, When the tooth sections of the rotating drive gear 313X2 oppose the tooth groove sections of the magazine gear 391Y2, the drive gear 313X2 is moved in the X2 direction with a spring force F of the compression coil spring 314X2 so as to correctly mesh with the magazine gear 391Y2 as shown in FIG. 29D.

After the drive gear 313X2 meshes with the magazine gear 391Y2, the gear 312 is rotated by the magazine drive motor 333 through the reduction gear 334. Accordingly, the drive shaft 310, the drive gears 313X1 and 313X2 are rotated. The rotation of the drive gear 313X2 is transmitted to the magazine gear 391Y2, the large-diameter gear member 388Y2, the gear section 387Y2, and to the pulley 386Y2 (FIG. 24A). Thus, the belt 400 is driven so as to move the tape cartridge containers 401 together with the tape cartridges 10 stored in the tape cartridge containers 401.

When a command to stop driving the tape cartridge transport magazine 104 is input, the magazine drive motor 333 is stopped. Then, the stepping motor 165 is driven in the reverse direction to rotate the turntable 140 back to the home position. Also, the drive shaft unit 301 is moved in the X1 direction back to the home position shown in FIG. 24A.

If a command to drive the tape cartridge transport magazine 103 is input when the drive shaft unit 301 is located at the home position shown in FIG. 24A, the stepping motor 165 is driven in the reverse direction by the motor control circuit 410 (FIG. 4) so as to drive the magazine drive motor 333. Thus, the drive gear 313X1 correctly meshes with a magazine gear 391Y2-1 of the tape cartridge transport magazine 103 (see FIG. 24C) in the same manner as described above. Accordingly, the belt 400 is driven by the magazine drive motor 333 so as to move the tape cartridge containers 401.

When a command to stop driving the tape cartridge transport magazine 103 is input, the magazine drive motor 333 is stopped. Then, the stepping motor 165 is driven in the reverse direction to rotate the turntable 140 back to the home position. Also, the drive shaft unit 301 is moved in the X2 direction back to the home position shown in FIG. 24A.

Figure 30:
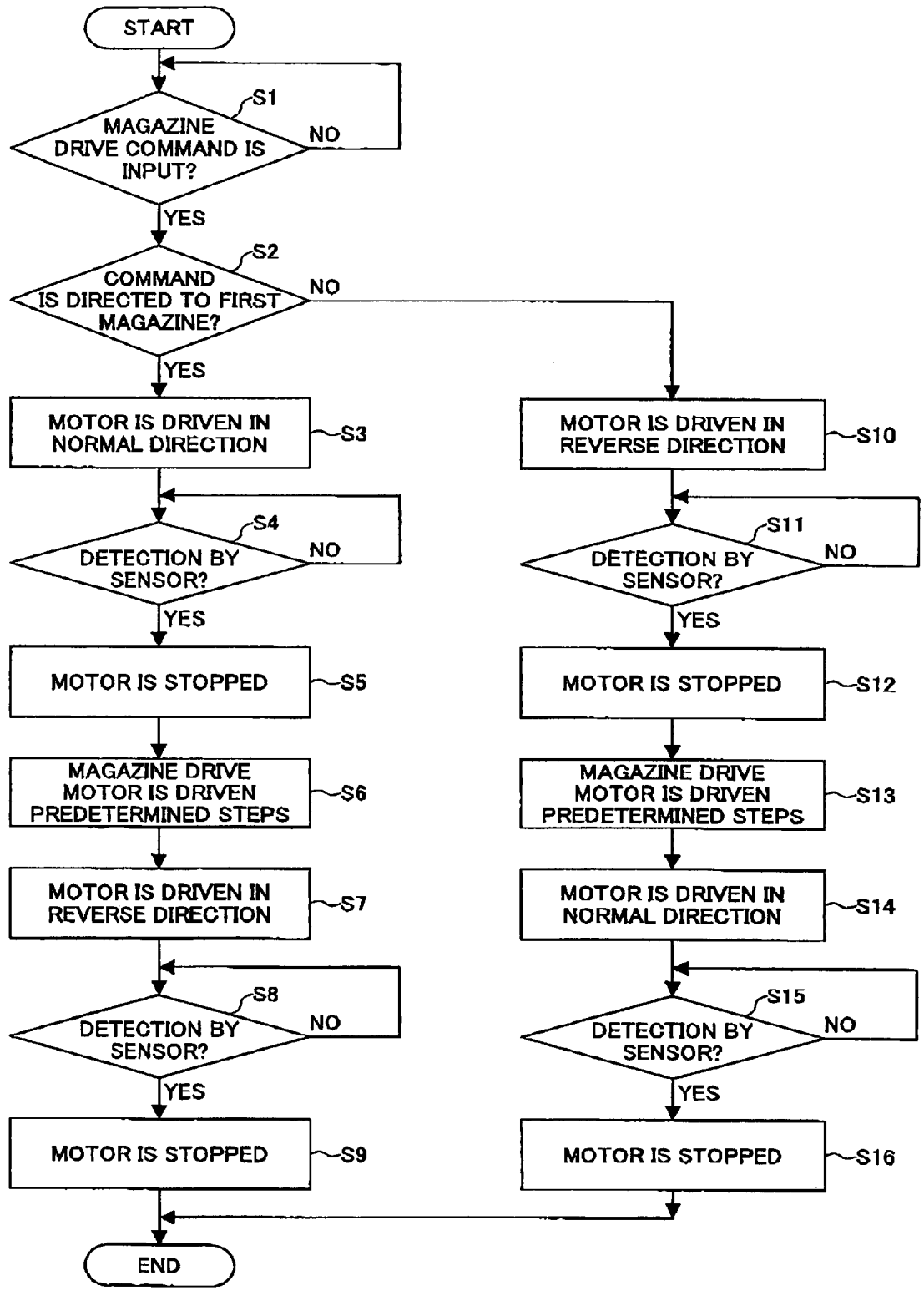
FIG. 30 is a flowchart illustrating operations of a microcomputer of a motor control circuit.

7 [Operations of Microcomputer of Motor Control Circuit 410] (FIG. 30)

The microcomputer of the motor control circuit 410 operates as illustrated in FIG. 30.

When a magazine drive command is input, the microcomputer determines whether the command is directed to the first magazine 104 (S1, S2). If the command is directed to the first magazine 104, the microcomputer drives the stepping motor 165 in the normal direction. When the photo sensor 370 detects that the turntable 140 is rotated 90 degrees in the counterclockwise direction, the microcomputer stops the stepping motor 165 (S3, S4, S5). After that, the magazine drive motor 333 is driven predetermined steps (S6). The microcomputer then drives the stepping motor 165 in the reverse direction. When the photo sensor 370 detects that the turntable 140 is rotated in the clockwise direction to the home position, the microcomputer stops the stepping motor 165 (S7, S8, S9).

If the command is directed to the second magazine 103, the microcomputer drives the stepping motor 165 in the reverse direction. When the photo sensor 370 detects that the turntable 140 is rotated approximately 90 degrees in the clockwise direction, the microcomputer stops the stepping motor 165 (S10, S11, S12). After that, the magazine drive motor 333 is driven predetermined steps (S13). The microcomputer then drives the stepping motor 165 in the normal direction. When the photo sensor 370 detects that the turntable 140 is rotated in the counterclockwise direction to the home position, the microcomputer stops the stepping motor 165 (S14, S15, S16).

The present application is based on Japanese Priority Application No. 2005-229738 filed on Aug. 8, 2005, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader, comprising:
   a media cartridge picker that transports a media cartridge;
   a media drive that receives the media cartridge;
   first and second media cartridge transport magazines that are positioned near the cartridge picker, each media cartridge transport magazine being configured to selectively store the media cartridge; and
   a magazine drive device that is coupled to the media cartridge transport magazines, the magazine drive device including a magazine drive motor, the magazine drive device alternately driving movement of each of the media cartridge transport magazines with a driving force generated by the magazine drive motor.

2. The media cartridge autoloader as claimed in claim 1, wherein the media cartridge picker includes a turntable that supports the media cartridge, and a turntable motor that rotates the turntable so as to change the orientation of the media cartridge.

3. The media cartridge autoloader as claimed in claim 2, wherein each of the media cartridge transport magazines includes a magazine gear on a side facing the media cartridge picker.

4. The media cartridge autoloader as claimed in claim 3, wherein the magazine drive device includes (i) a drive shaft unit movable in a lateral direction, including a drive shaft rotated by the magazine drive motor, and drive gears provided one on each lateral end of the drive shaft, and (ii) a drive shaft unit shifter that is driven with a driving force of the turntable motor so as to move the drive shaft unit in the lateral direction to cause the drive gear at the front side in a moving direction of the drive shaft unit to mesh with the magazine gear of one of the media cartridge transport magazines.

5. The media cartridge autoloader as claimed in claim 4, wherein when said drive gear at the front side in the moving direction meshes with the magazine gear of said media cartridge transport magazine, the magazine drive motor is driven, and the driving force of the magazine drive motor is transmitted through the drive shaft and said drive gear so as to drive said media cartridge transport magazine.

6. The media cartridge autoloader as claimed in claim 4, wherein the media cartridge picker includes a sensor that detects a rotating angle of the turntable with respect to a home position of the turntable; and
   a timing to stop the drive shaft unit shifter is determined in accordance with a detection by the sensor.

7. The media cartridge autoloader as claimed in claim 4, further including a base having an extension extending further forward than the media cartridge picker; wherein
   the drive shaft unit, the drive shaft unit shifter, and the magazine drive motor are disposed on the extension.

8. The media cartridge autoloader as claimed in claim 4, wherein the drive shaft unit includes positioning pins provided one on each lateral end and extending further outward than the corresponding drive gears;

each of the media cartridge transport magazines includes a positioning hole; and when said drive gear of the drive shaft unit being moved by the drive shaft unit shifter reaches near the magazine gear of said media cartridge transport magazine, one of the positioning pins fits into the positioning hole to correct a center distance between said drive gear and said magazine gear to an appropriate distance.

9. The media cartridge autoloader as claimed in claim 8, wherein each of the positioning pins includes a conical front end.

10. The media cartridge autoloader as claimed in claim 4, wherein the drive gears are slidably movable on the drive shaft;

the drive shaft unit includes compression coil springs corresponding to the drive gears; and if said drive gear of the drive shaft unit being moved by the drive shaft unit shifter fails to mesh with the magazine gear of said media cartridge transport magazine, the drive gear remains at a position as it is with the corresponding compression coil spring being compressed, and moves with a spring force of the compression coil spring to mesh with the magazine gear when the drive gear starts rotating.

11. The media cartridge autoloader as claimed in claim 4, wherein each of the drive gears includes a taper face on an outer side thereof.

12. A method for operating a media cartridge autoloader including a media drive that receives one of a plurality of media cartridges, first and second media cartridge transport magazines that movably store the media cartridges, and a media cartridge picker that transports the media cartridges, the method comprising;

alternately coupling a drive motor to the first media cartridge transport magazine and the second media cartridge transport magazine; and alternately driving movement of a portion of the first media cartridge transport magazine and a portion of the second media cartridge transport magazine with the drive motor to alternately and selectively move one or more of the media cartridges within the first media cartridge transport magazine and the second media cartridge transport magazine.

* * * * *